US007002648B2

(12) United States Patent
Iwasa

(10) Patent No.: US 7,002,648 B2
(45) Date of Patent: Feb. 21, 2006

(54) REFLECTIVE LIQUID CRYSTAL DISPLAY

(75) Inventor: Takayuki Iwasa, Yamato (JP)

(73) Assignee: Victor Company of Japan, Limited, Kanagawa-ken (JP)

( * ) Notice: Subject to any disclaimer, the term of this patent is extended or adjusted under 35 U.S.C. 154(b) by 137 days.

(21) Appl. No.: 10/785,224

(22) Filed: Feb. 25, 2004

(65) Prior Publication Data

US 2004/0169798 A1    Sep. 2, 2004

(30) Foreign Application Priority Data

Feb. 28, 2003   (JP)   ............................ P2003-054215

(51) Int. Cl.
  *G02F 1/1335*   (2006.01)
  *G02F 1/1343*   (2006.01)

(52) U.S. Cl. ........................................ 349/113; 349/38
(58) Field of Classification Search ............ 349/38–39, 349/42–44, 113, 139
See application file for complete search history.

(56) References Cited

U.S. PATENT DOCUMENTS 5,978,056 A * 11/1999 Shintani et al. ............. 349/137
6,853,419 B1 *  2/2005 Iwasa ......................... 349/113

FOREIGN PATENT DOCUMENTS

JP   2001-075127   3/2001
JP   2004-264534 * 9/2004

* cited by examiner

*Primary Examiner*—Dung T. Nguyen
(74) *Attorney, Agent, or Firm*—Nath & Associates; Gary M. Nath; Gregory B. Kang

(57) ABSTRACT

A reflective LCD has a plurality of pixels formed in rows and columns in a matrix. Among the pixels, pixels A and B are arranged adjacent to each other in the same column. A connection line is arranged over the two pixels A and B arranged adjacent to each other in the same column. A first end of the connection line is connected to a capacitor electrode contact of a storage capacitor formed in the pixel A and to a reflective pixel electrode formed in the pixel A. A second end of the connection line is extended over a gate line for the pixel A with an insulating film among functional films being between the connection line and the gate line and is connected to a source electrode (or drain electrode) of a switching element formed in the pixel B.

2 Claims, 16 Drawing Sheets

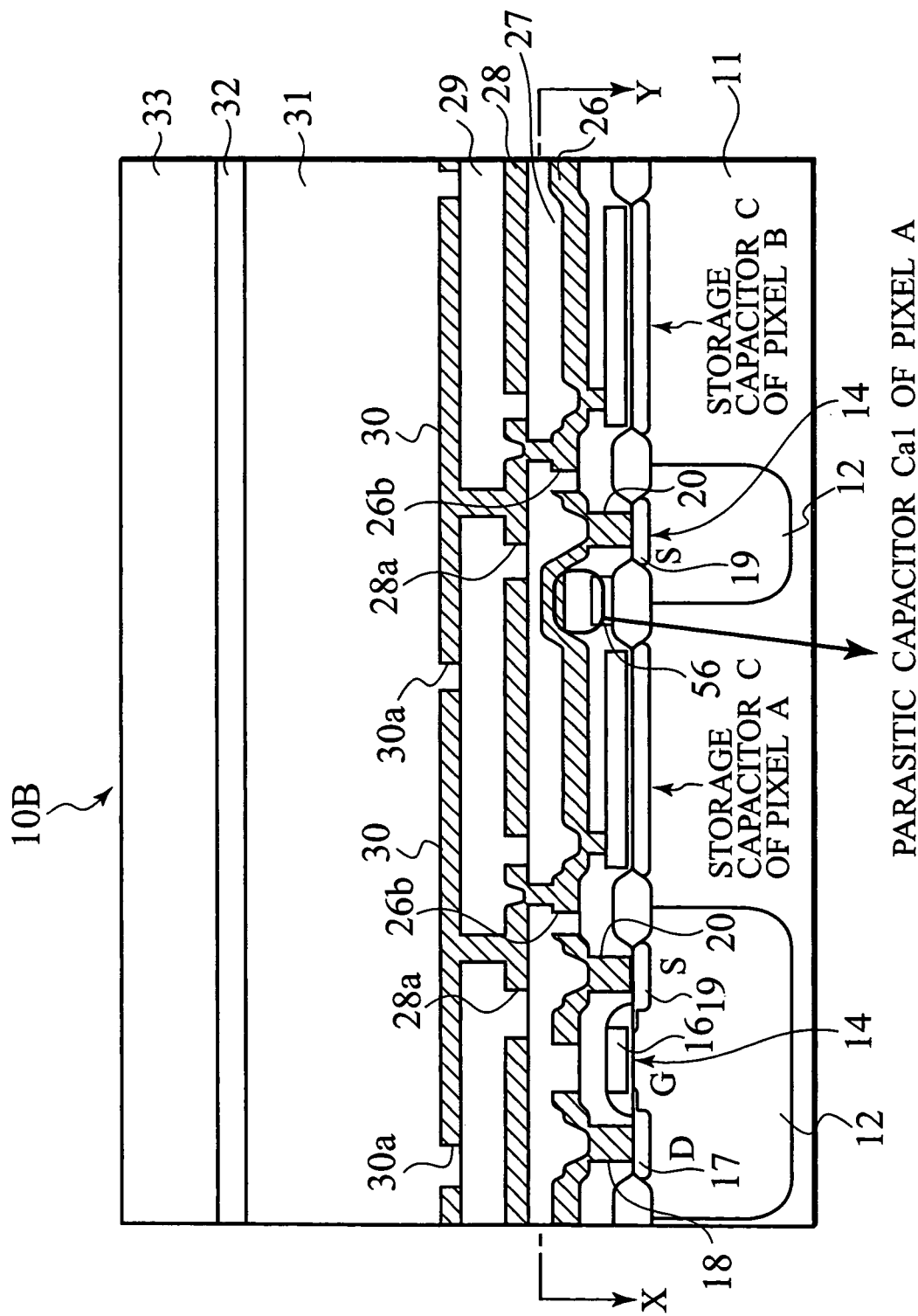

REFLECTIVE LIQUID CRYSTAL DISPLAY

BACKGROUND OF THE INVENTION

1. Field of the Invention

The present invention relates to a layout structure of a reflective LCD (liquid crystal display), and particularly, to a reflective LCD configured to change a gate-line scanning direction depending on usage (for example, overhead usage and desktop usage) of the LCD and reduce the influence of the feed-through characteristics of a pixel A caused depending on a gate-line scanning direction when the pixel A is arranged adjacent to a pixel B in the same column.

2. Description of Related Art

Recently, projection LCDs to display images on large screens are extensively used for, for example, outdoor public displays, control operation displays, and high-resolution image displays conforming to hi-vision broadcast standards and SVGA computer graphics standards.

The projection LCDs are largely classified into transmission LCDs based on a transmission method and reflective LCDs based on a reflection method. The transmission LCDs have a drawback that a TFT (thin film transistor) formed in each pixel is unable to serve as a transmission area to transmit light, and therefore, reduces a numerical aperture. For this reason, the reflective LCDs are attracting attention.

Generally, the reflective LCD employs a semiconductor substrate (Si substrate) on which a plurality of switching elements and storage capacitors for the switching elements are formed and are electrically isolated pixel by pixel. Over the switching elements and storage capacitors, a plurality of functional films are formed one upon another. The top one of the functional films is a metal film that forms a plurality of reflective pixel electrodes that are electrically isolated from one another. One switching element, one storage capacitor connected to the switching element, and one reflective pixel electrode connected to the switching element form a pixel. Such pixels are arranged in rows and columns to form a matrix on the semiconductor substrate. Facing the reflective pixel electrodes, a transparent counter electrode commonly serving for all pixels is formed on the reverse of a transparent substrate. Between the reflective pixel electrodes and the counter electrode, liquid crystals are sealed to form the reflective LCD. From the transparent substrate side, color-image read light is made incident through the counter electrode to the liquid crystals. At this time, the switching elements are driven to change potential differences between the reflective pixel electrodes and the counter electrode in response to video signals, to control orientation of the liquid crystals, modulate and reflect the color-image read light by the reflective pixel electrodes, and emit the light from the transparent substrate.

FIG. 1 is an enlarged view showing a model of a pixel in a reflective LCD according to a related art 1. FIG. 1 corresponds to a sectional view taken along an arrow line X-Y of FIG. 5. FIGS. 2A and 2B are explanatory views showing an active-matrix drive circuit in the reflective LCD of the related art 1, in which FIG. 2A is a block diagram showing the active-matrix drive circuit and FIG. 2B is an enlarged circuit diagram showing a transistor area shown in FIG. 2A.

The reflective LCD 10A of the related art 1 of FIG. 1 is designed for a standard reflective projector. Among a plurality of pixels of the LCD 10A to display images, one pixel will be enlarged and explained. A semiconductor substrate 11 serving as a base of the LCD is a p-type Si substrate (or an n-type Si substrate) made of monocrystalline silicon. At the left side of the semiconductor substrate (hereinafter referred to as p-type Si substrate) 11 in FIG. 1, a p-well region 12 is formed and is electrically isolated pixel by pixel with left and right field oxide films 13A and 13B. Within the p-well region 12, a switching element 14 is formed, which is a MOSFET (metal oxide semiconductor field effect transistor).

The switching element (hereinafter referred to as MOSFET) 14 has a gate G consisting of a gate oxide film 15 formed approximately at the center of the surface of the p-well region 12 and a gate electrode 16 made of polysilicon on the gate oxide film 15.

On the left side of the gate G of the MOSFET 14 in FIG. 1, a drain region 17 is formed, and on the drain region 17, a drain electrode 18 is formed from aluminum wiring in a first via hole Via1, to constitute a drain D.

On the right side of the gate G of the MOSFET 14 in FIG. 1, a source region 19 is formed, and on the source region 19, a source electrode 20 is formed from aluminum wiring in a first via hole Via1, to constitute a source S.

On the right side of the p-well region 12 in the p-type Si substrate 11 in FIG. 1, a diffused capacitor electrode 21 is formed by ion implantation. The diffused capacitor electrode 21 is electrically isolated pixel by pixel with the left and right field oxide films 13B and. 13C. According to the related art 1, a range from the field oxide film 13A to the field oxide film 13C corresponds to a pixel.

On the diffused capacitor electrode 21, an insulating film 22 and a capacitor electrode 23 are formed in this order. On the capacitor electrode 23, a capacitor electrode contact 24 is formed from aluminum wiring in a first via hole Via1, to constitute a storage capacitor C for the MOSFET 14.

Over the field oxide films 13A to 13C, gate electrode 16, and capacitor electrode 23, functional films including a first interlayer insulating film 25, a first metal film 26, a second interlayer insulating film 27, a second metal film 28, a third interlayer insulating film 29, and a third metal film 30 are formed one upon another in this order.

The first, second, and third interlayer insulating films 25, 27, and 29 are formed from, for example, $SiO_2$ (silicon oxide) having an insulating ability.

The first, second, and third metal films 26, 28, and 30 are made of, for example, conductive aluminum wiring and are segmented into predetermined patterns corresponding to the pixels or the switching elements 14, respectively. Within one pixel, the first, second, and third metal films 26, 28, and 30 are electrically connected to each other. The first, second, and third metal films 26, 28, and 30 in a given pixel are electrically isolated from those in any adjacent pixel with openings 26a (FIG. 4), 28a, and 30a formed in the metal films 26, 28, and 30 between the adjacent pixels. Each of the openings 26a, 28a, and 30a has a thin width and is substantially drawn in a rectangular shape.

In each pixel, the lowermost first metal film 26 is connected to the corresponding switching element 14 and storage capacitor C.

In each pixel, the intermediate second metal film 28 serves as a light blocking metal film to block part of read light L made incident to an upper transparent substrate 33 (to be explained later) from reaching the MOSFET 14 formed under the metal film 28 on the p-type Si substrate 11. Namely, the second metal film (light blocking metal film) 28 is formed to cover the opening 30a formed between the adjacent third metal films 30 formed over the film 28 and block part of the read light L entered through the opening 30a. The second metal film 28 is connected to the lower most first metal film 26 through aluminum wiring filled in a second via hole Via2 etched in the second interlayer insulating film 27.

In each pixel, the top third metal film 30 is formed as a square reflective pixel electrode for the pixel. The metal film 30 is separated from any adjacent one by the opening 30a formed between them and is connected to the intermediate second metal film 28 through aluminum wiring filled in a third via hole Via3 etched in the third interlayer insulating film 29.

On the third metal film (hereinafter referred to as reflective pixel electrode) 30, liquid crystals 31 are sealed. On the liquid crystals 31, a transparent counter electrode 32 is formed on the reverse of the transparent substrate (glass substrate) 33, to face the reflective pixel electrodes 30. The counter electrode 32 serves as a common electrode for the reflective pixel electrodes 30, and therefore, is not segmented into pixels. The counter electrode 32 is made of for example, ITO (indium tin oxide).

In the reflective LCD 10A according to the related art 1, the active-matrix drive circuit to drive a matrix of pixels arranged in rows and columns on the p-type Si substrate 11 will be explained with reference to FIGS. 2A and 2B.

In FIGS. 2A and 2B, the active-matrix drive circuit 50 of the reflective LCD 10A according to the related art 1 drives a matrix of pixels arranged in rows and columns on the p-type Si substrate 11, each pixel composed of a MOSFET 14, a storage capacitor C connected to the MOSFET 14, and a reflective pixel electrode 30 connected to the MOSFET 14.

To select one of the pixels, a horizontal shift register circuit 51 and a vertical shift register circuit 55 are arranged in column and row directions, respectively.

For each column of pixels, the horizontal shift register circuit 51 has a video switch 52 and a signal line 53 extended from the video switch 52 in a column direction (vertical direction). For the sake of convenience of drawing, FIG. 2A shows only one signal line 53 connected to the horizontal shift register circuit 51. The signal lines 53 sequentially supply video signals. Between the horizontal shift register 51 and the video switch 52, the signal line 53 is connected to a video line 54. The signal line 53 is also connected to the drain electrodes 18 of the MOSFETs 14 that are in the same column for which the signal line 53 is provided.

For each row of pixels, the vertical shift register circuit 55 has a gate line 56 extended in a row direction (horizontal direction). For the sake of convenience of drawing, FIG. 2A shows only one gate line 56 extended from the horizontal shift register circuit 55. The gate lines 56 sequentially supply gate pulses in a scanning direction to be explained later. The gate line 56 is connected to the gate electrodes 16 of the MOSFETs 14 that are in the same row for which the gate line 56 is provided.

In each pixel, the source electrode 20 of the MOSFET 14 is connected to the capacitor electrode 23 of the storage capacitor C through the capacitor electrode contact 24 and the aluminum wiring of the first metal film 26 (FIG. 1). Also, the source electrode 20 is connected to the reflective pixel electrodes 30 through the aluminum wiring of the first and second metal films 26 and 28 (FIG. 1).

The active-matrix drive circuit 50 employs a known frame inversion driving method that inverts the polarity of video signals between positive and negative polarities frame period by frame period. For example, video signals to be written in an "n"th frame period are provided with positive polarity and those to be written in an "n+1"th frame period are provided with negative polarity. To supply a video signal through the signal line 53, the signal line 53 must be connected to one of the drain electrode 18 and source electrode 20 of the MOSFET 14. In this example, the signal line 53 is connected to the drain electrode 18 of the MOSFET 14 as mentioned above. If the signal line 53 is connected to the source electrode 20, the drain electrode 18 of the MOSFET 14 is connected to the storage capacitor C and reflective pixel electrode 30.

In the reflective LCD 10A according to the related art 1, a fixed well potential is supplied to the MOSFET 14, and a fixed common potential COM is supplied to the storage capacitor C.

The well potential to the MOSFET 14 is fixed to, for example, 15 V and is supplied between the gate line 56 and a well potential contact (not shown) on a $p^+$ region formed in the p-well region 12 (FIG. 1). If an n-type Si substrate is employed, the well potential is, for example, 0 V.

The common potential COM to the storage capacitor C is fixed to, for example, 8.5 V and is supplied between the capacitor electrode 23 of the storage capacitor C and a common potential contact (not shown) on the diffused capacitor electrode 21. The common potential COM can basically be of any voltage to form the storage capacitor C. It may be set to a center value (for example, 8.5 V) of video signals, to make the voltage applied to the storage capacitor C about half a source voltage. Namely, a storage capacitor withstand voltage can be about half a source voltage. This enables the insulating film 22 of the storage capacitor C to be thinned to increase a capacitance value. Larger the storage capacitance value of the storage capacitor C, the smaller a potential change on the reflective pixel electrode 30. This is advantageous in preventing the flickering and burning of the liquid crystals 31 (FIG. 1).

The storage capacitor C stores charge in response to a potential difference between a potential applied to the reflective pixel electrode 30 and the common potential COM, keeps the stored voltage during an unselected period or OFF period of the MOSFET 14, and continuously applies the stored voltage to the reflective pixel electrode 30.

To drive pixels, video signals are sequentially supplied to the video lines 54 at shifted timing in the active-matrix drive circuit 50 of the reflective LCD 10A according to the related art 1. One of the video signals is supplied to the columnar signal line 53 through the video switch 52. At this time, a MOSFET 14 located at an intersection of the signal line 53 and a selected gate line 56 is selected and turned on.

The video signal is supplied to the reflective pixel electrode 30 of the selected MOSFET 14 through the signal line 53 and is written as charge into the storage capacitor C. This results in causing a potential difference between the selected reflective pixel electrode 30 and the counter electrode 32 (FIG. 1) according to the video signal and modulates the optical characteristics of the liquid crystals 31. As a result, color-image read light L (FIG. 1) emitted to the transparent substrate 33 is modulated by the liquid crystals 31 pixel by pixel, is reflected by the reflective pixel electrodes 30, and is emitted from the transparent substrate 33. Unlike the transmission LCD, the reflective LCD can utilize read light L nearly 100% to provide high-resolution, high-luminance projection images.

Parasitic capacitors will be explained with reference to FIGS. 3 to 5. On the Si substrate 11, a plurality of pixels are arranged in orthogonal columns and rows to form a matrix of pixels. In any one of the columns, parasitic capacitors are generated between pixels A and B, where the pixel A is arranged on the top side of the reflective LCD 10A relative to the pixel B in the same column and the pixel B is arranged beside and on the lower side of the pixel A in the same column.

FIG. 3 is a circuit diagram explaining the parasitic capacitors produced in the pixels A and B that are adjacent to each other in the same column in the reflective LCD according to the related art 1. FIG. 4 is a sectional view taken along the arrow line X-Y of FIG. 5, explaining the parasitic capacitors produced in the pixel A in the reflective LCD of the related art 1 where the pixels A and B are adjacent to each other in the same column. FIG. 5 is a plan view showing the semiconductor substrate (Si substrate) seen from the first metal film side along an arrow line X-Y of FIG. 4 and explaining the parasitic capacitors produced in the pixel A in the reflective LCD of the related art 1 where the pixels A and B are adjacent to each other in the same column.

In FIG. 3, the pixels A and B are arranged adjacent to each other in a columnar direction in the same column. The pixel A that is upper in the columnar direction than the pixel B involves the parasitic capacitors Ca1 and Ca2. Like the pixel A, the pixel B that is lower in the columnar direction than the pixel A involves the parasitic capacitors Cb1 and Cb2.

Between the gate line 56 of the pixel A and the source electrode 20 of the MOSFET 14 of the pixel A, the parasitic capacitor Ca1 is present. Between the source electrode 20 of the MOSFET 14 of the pixel A and the gate line 56 of the pixel B, the parasitic capacitor Ca2 is present. Like the pixel A, between the gate line 56 of the pixel B and the source electrode 20 of the MOSFET 14 of the pixel B, the parasitic capacitor Cb1 is present. Between the source electrode 20 of the MOSFET 14 of the pixel B and the gate line 56 of a pixel C, the parasitic capacitor Cb2 is present.

In FIG. 4, the source electrode 20 of the MOSFET 14 of the upper pixel A is connected to the storage capacitor C and reflective pixel electrode 30 of the pixel A. The source electrode 20 of the MOSFET 14 of the lower pixel B is connected to the storage capacitor C and reflective pixel electrode 30 of the pixel B. Under these conditions, the pixels A and B are electrically isolated from each other.

In FIG. 5 that is a plan view showing the Si substrate (semiconductor substrate) 11 seen from the first metal film 26 side along the line X-Y of FIG. 4, the areas of the pixels A and B include each the drain electrode 18, gate electrode 16, and source electrode 20 of the MOSFET 14. In each pixel area, these electrodes are arranged at an upper left part of the pixel area in a row direction (horizontal direction). At a lower part of each pixel area, the diffused capacitor electrode 21, insulating film 22 (FIG. 1), and capacitor electrode 23 are laid one upon another to form the storage capacitor C occupying a large area.

The pixel A is in one row and the pixel B is in a row that is just below the row of the pixel A. The pixels A and B receive gate pulses through the gate lines 56, respectively. Each gate line 56 is made of polysilicon and is wired in the row direction (horizontal direction) as indicated with a hatched section at an upper part of each pixel area. In the middle of each pixel area, the gate line 56 is branched in a T-shape and is connected to the gate electrode 16 of the MOSFET 14.

The pixels A and B in the same column are commonly connected to one signal line 53 that supplies a video signal to the column. The signal line 53 is made of aluminum wiring of the first metal film 26 (FIG. 4) and is laid in the columnar direction (vertical direction) as indicated with a dotted section at the left side of each pixel area. The signal line 53 is connected to the drain electrode 18 of the MOSFET 14 of each of the pixels A and B.

A connection line 57 for each of the pixels A and B is made of aluminum wiring of the first metal film 26 and is laid in the column direction (vertical direction) to drive the pixel, as indicated with a dotted section substantially at the center of each pixel area. In each of the pixels A and B, the connection line 57 is connected to the capacitor electrode contact 24 formed on the capacitor electrode 23 of the pixel and is also connected to the reflective pixel electrode 30 through aluminum wiring of the first and second metal films 26 and 28 (FIG. 4).

A common line 58 is common for the pixels A and B in the same column and supplies the common potential COM to the pixels A and B. The common line 58 is made of aluminum wiring of the first metal film 26 (FIG. 4) and is laid in the column direction (vertical direction) as indicated with a dotted section on the right side of each pixel area. The common line 58 is connected to a common potential contact 59 formed on the diffused capacitor electrode 21 of each of the pixels A and B.

A well line 60 is common for the pixels A and B in the same column and supplies a well potential to the pixels A and B. The well line 60 is made of aluminum wiring of the first metal film 26 (FIG. 4) and is laid in the column direction (vertical direction) as indicated with a dotted section on the right side of the common line 58 in each pixel area. The well line 60 is connected to a well potential contact 61 formed in the p-well region 12 (FIG. 4) of each of the pixels A and B.

With the wiring mentioned above, the parasitic capacitor Ca1 of the pixel A is produced at a part (overlap part) where the gate line 56 of the pixel A indicated with the hatched section overlaps the connection line 57 of the pixel A indicated with the dotted section. The parasitic capacitor Ca2 of the pixel A is produced at apart (overlap part) where the connection line 57 of the pixel A indicated with the dotted section overlaps the gate line 56 of the pixel B indicated with the hatched section. The sectional views of these parasitic capacitors are seen in FIG. 4. The parasitic capacitors Cb1 and Cb2 of the pixel B are not shown in FIGS. 4 and 5 but they are produced like those of the pixel A.

Actual operation in the above-mentioned structure will be considered. When the MOSFET 14 is turned off in the pixel A, a pixel potential on the reflective pixel electrode 30 of the pixel A must be retained until the MOSFET 14 is turned on in the next frame. This pixel potential retention time is, for example, 1/30 sec. During this period, a pixel potential variation must be suppressed within, for example, 5 mV. If this pixel potential variation is not kept, inconveniences such as the flickering and burning of the liquid crystals 31 (FIG. 1) occur.

In general, a parasitic capacitor produced in a pixel of an LCD changes a pixel voltage and causes flickering due to a scan line (gate line) delay. An active-matrix LCD element solving the problem of parasitic capacitors is disclosed in, for example, Japanese Unexamined Patent Application Publication No. 2001-75127.

FIG. 6 is an equivalent circuit diagram showing an active-matrix LCD element according to a related art 2.

The active-matrix LCD element 100 of the related art 2 shown in FIG. 6 is the one disclosed in the Japanese Unexamined Patent Application Publication No. 2001-75127. With reference to the publication, the related art 2 will briefly be explained.

The active-matrix LCD element 100 of the related art 2 involves scan lines 101 arranged in a row direction (horizontal direction), signal lines 102 arranged in a column direction (vertical direction) orthogonal to the scan lines 101, and TFT elements 103 serving as switching elements formed at intersections of the lines 101 and 102.

Each scan line 101 is connected to gate electrodes G of the TFT elements 103 that are arranged in a row corresponding to the scan line 101. Each signal line 102 is connected to source electrodes S of the TFT elements 103 that are arranged in a column corresponding to the signal line 102. A drain electrode D of the TFT element 103 is connected to a liquid crystal capacitor 104, a storage capacitor 105, and a pixel electrode 107. Between the gate electrode G and drain electrode D of the TFT element 103, there is a parasitic capacitor 106. The parasitic capacitor 106 is generated due to the overlapping of the gate electrode G and drain electrode D.

In a process of forming thin film patterns for the drain electrodes D of the TFT elements 103, the related art 2 changes an exposure stage scanning speed or an exposure quantity to control a scaling correction value such that a parasitic capacitor region of an "n"th TFT element 103 becomes smaller than a parasitic capacitor region of an "n+1"th TFT element 103, the "n"th and "n+1"th TFT elements being adjacent to each other in a row direction (horizontal direction) scanned with the scan line 101. The active-matrix LCD element having such patterns involves an in-plane distribution of parasitic capacitors in connection with pixels that are adjacent to each other in the row direction, to improve the uniformity of a display screen and realize a high-quality LCD panel.

The reflective LCD 10A of the related art 1 shown in FIG. 1 is mainly used as a projector. Usage types of the projector are classified into overhead usage to suspend the projector upside down from the ceiling and desktop usage to set the projector on the floor or a shelf. The reflective LCD 10A is designed for both the usage types.

FIGS. 7A and 7B are model views showing the usage of the reflective LCD 10A of the related art 1. FIG. 7A shows the reflective LCD 10A in the overhead usage with the vertical shift register circuit 55 scanning the gate lines in a scanning direction U, and FIG. 7B shows the reflective LCD 10A in the desktop usage with the vertical shift register circuit 55 scanning the gate lines in a scanning direction D. FIGS. 8A and 8B are signal waveform diagrams of the reflective LCD 10A of the related art 1, showing the feed-through characteristics of the pixel A that differ depending on the gate line scanning directions. FIG. 8A is when the gate lines are scanned in the direction U, and FIG. 8B is when the gate lines are scanned in the direction D.

In FIG. 7A, the reflective LCD 10A of the related art 1 is in the overhead usage. A casing K is suspended from the ceiling with a bottom side Ka of the casing K facing the ceiling. The vertical shift register circuit 55 explained with reference to FIG. 2A scans the gate lines 56 in the scanning direction U row by row, thereby scanning the pixels. Namely, the pixels B and A arranged in the same column are scanned in this order from the bottom side Ka toward a top side Kb of the casing K.

In FIG. 7B, the reflective LCD 10A of the related art 1 is in the desktop usage. The bottom side Ka of the casing K is set on the floor or a shelf. In this case, the vertical shift register circuit 55 scans the gate lines 56 row by row in the scanning direction D that is opposite to the scanning direction U mentioned above, thereby scanning the pixels. Namely, the pixels A and B arranged in the same column are scanned in this order from the top side Kb toward the bottom side Ka of the casing K.

In the pixel layout of the reflective LCD 10A according to the related art 1, the different scanning directions of the gate lines 56 cause a problem that pixel voltage becomes asymmetrical from frame to frame. This is caused by the parasitic capacitors Ca1 and Ca2 of the pixel A that are formed when the pixels A and B are adjacent to each other in the same column as mentioned above.

This will be explained in more detail with reference to FIGS. 5, 8A and 8B. In FIG. 8A, the pixels A and B are arranged adjacent to each other in the same column, and the vertical shift register circuit 55 explained with reference to FIG. 2A scans the gate lines 56 in the scanning direction U to write, for example, "white" in all pixels. At this time, drive voltage waveforms generated by the frame inversion driving method will be as shown in FIG. 8A.

In this case, the pixel A that is on the top side of the reflective LCD 10A relative to the pixel B in the same column receives a video signal SIG. The video signal SIG has a signal center voltage Vsigc that is higher than a reference voltage 0 V. Around the signal center voltage Vsigc, the video signal SIG having a rectangular waveform alternates between a lower voltage Vd and a higher voltage Vp. The video signal SIG alternating between positive and negative polarities frame by frame is applied to the drain electrode 18 of the MOSFET 14 in the pixel A. Namely, in an "n"th frame (n being a natural number), the video signal SIG is set to be positive and is written into the pixel A, and in an "n+1" the frame, it is inverted to be negative and is written into the pixel A.

After the video signal SIG is applied to the pixel A in the "n"th frame, a gate pulse GAg of a voltage Vg is applied for a write time tw to the gate electrode 16 of the MOSFET 14 in the pixel A through the gate line 56 of the pixel A. This turns on the MOSFET 14 of the pixel A, to accumulate the video signal SIG as charge in the storage capacitor C of the pixel A.

At this time, the gate lines 56 are scanned in the scanning direction U, and therefore, the pixel B is driven before the pixel A. As indicated with a dotted line, a gate pulse GBg is applied to the gate electrode 16 of the MOSFET 14 in the pixel B before the gate pulse GAg is applied to the pixel A.

When the gate pulse GAg for the pixel A rises, a write signal GAs for the pixel A is applied to the reflective pixel electrode 30 of the pixel A, the write signal GAs having a pixel electrode voltage Vp whose value is substantially equal to the upper voltage Vp of the video signal SIG. At this time, the write signal GAs for the pixel A is dependent on the write characteristics, feed-through characteristics, and storage characteristics of the pixel A.

Namely, a rise of the write signal GAs for the pixel A is dependent on the write characteristics of the pixel A, which are dependent on an ON current of the MOSFET 14 of the pixel A, the write time tw, and the upper voltage Vp of the video signal SIG.

After the gate pulse GAg is applied to the gate G of the pixel A for the write time tw, the gate G is turned off. At this time, the write signal GAs for the pixel A drops below the pixel electrode voltage Vp by a feed-through voltage ?Vp1.

Thereafter, the write signal GAs for the pixel A gradually drops toward the end of the "n"th frame due to the storage characteristics of the pixel A based on the storage capacitor C connected to the reflective pixel electrode 30 of the pixel A. This storage characteristics of the pixel A are dependent on the MOSFET OFF current, storage capacitance, retention time, and leak current through liquid crystal resistance of the pixel A.

The influence of the feed-through voltage ?Vp1 in the write signal GAs for the pixel A on a pixel potential will be examined. The feed-through voltage ?Vp1 attenuates toward the reference voltage 0 V in both the positive- and negative-polarity write operations. As a result, the positive and negative display signal potentials differ from each other by the feed-through voltage ?Vp1 relative to the signal center voltage Vsigc of the video signal SIG. This results in differing the positive and negative write potentials from each other and producing a DC offset component between them. To solve this problem, a counter electrode potential Vcom must be corrected in response to the offset potential component, to balance the positive- and negative-polarity write operations.

When the gate lines 56 are scanned in the scanning direction U, the feed-through voltage ?Vp1 of the pixel A is determined by the parasitic capacitor Ca1 of the pixel A shown in FIGS. 4 and 5. The gate pulse GBg to the pixel B is applied before the gate pulse GAg to the pixel A, and therefore, the gate pulse GBg to the pixel B becomes OFF before the generation of the feed-through due to the parasitic capacitor Ca1 of the pixel A, and the potential of the gate pulse GBg to the pixel B is set (fixed) to 0 V. As a result, no feed-through is caused by the parasitic capacitor Ca2 (FIGS. 4 and 5) of the pixel A.

In FIG. 8B, the pixels A and B are arranged adjacent to each other in the same column, and the vertical shift register circuit 55 explained with reference to FIG. 2A scans the gate lines 56 in the scanning direction D, to write, for example, "white" in all pixels. At this time, drive voltage waveforms according to the frame inversion driving method will be as shown in FIG. 8B.

In an "n"th frame, a video signal SIG is applied to the pixel A. Then, a gate pulse GAg of the voltage Vg is applied for a given write time tw to the gate electrode 16 of the MOSFET 14 of the pixel A through the gate line 56 of the pixel A. Thereafter, the gate pulse GAg of the pixel A is turned off. Just after that, a gate pulse GBg of the pixel B is turned on. When the gate pulse GAg of the pixel A is turned off, a feed-through of the pixel A toward the reference voltage 0 V occurs due to the parasitic capacitor Ca1 of the pixel A shown in FIGS. 4 and 5. At this time, the gate pulse GBg of the pixel B is turned on, and therefore, the potential of the gate pulse GAg of the pixel A drops toward 0 V and the potential of the gate pulse GBg of the pixel B increases toward Vg. During the period in which the potentials of the gate pulses GAg and GBg vary, the parasitic capacitor Ca2 (FIGS. 4 and 5) of the pixel A causes a feed-through of the pixel A opposite to the reference voltage 0 V.

As a result, when the gate lines 56 are scanned in the scanning direction D, the feed-through voltage of the pixel A becomes ?Vp2, which is smaller than the feed-through voltage ?Vp1 occurring when the gate lines 56 are scanned in the scanning direction U.

This means that the counter electrode potential Vcom to cancel the DC offset component must have different values dependent upon the scanning directions U and D. If the counter electrode potential Vcom is fixed to a single value, the effect of the counter electrode potential Vcom changes when the scanning direction is changed, to generate DC components that affect the liquid crystals 31 (FIG. 4), thereby causing the flickering and burning of the liquid crystals 31.

The technical idea of the Japanese Unexamined Patent Application Publication No. 2001-75127 explained with reference to FIG. 6 may be effective to cope with parasitic capacitor regions of the "n"th and "n+1"th TFT elements 103 that are adjacent to each other in a row direction (horizontal direction). However, this related art provides no countermeasure for parasitic capacitor regions of the "m−1"th and "m"th TFT elements 103 that are adjacent to each other in a column direction (vertical direction). Accordingly, the technical idea of the Japanese Unexamined Patent Application Publication No. 2001-75127 is inapplicable to solve the feed-through problem of the related art 1 caused in the pixels A and B that are arranged adjacent to each other in a column direction (vertical direction) when changing the scanning direction of the gate lines 56 between the directions U and D.

SUMMARY OF THE INVENTION

There is a requirement for a reflective LCD configured to change a gate-line scanning direction according to the usage (for example, overhead usage or desktop usage) of the reflective LCD, capable of minimizing the influence of feed-through of a pixel A caused by different gate-line scanning directions U and D when the pixel A is arranged adjacent to a pixel B in the same column.

In order to accomplish the object, an aspect of the present invention provides a reflective LCD having a semiconductor substrate, a plurality of switching elements, a plurality of storage capacitors provided for the switching elements, respectively, the switching elements with the storage capacitors being electrically isolated from one another, a plurality of functional films laid one upon another over the switching elements and storage capacitors, a plurality of reflective pixel electrodes formed from a metal film that is a top one of the functional films, the reflective pixel electrodes being electrically isolated from one another, each of the switching elements, one of the storage capacitors connected to the switching element, and one of the reflective pixel electrodes connected to the switching element forming a pixel, the pixels being arranged in rows and columns in a matrix on the semiconductor substrate, a transparent counter electrode formed on a reverse of a transparent substrate, to face the reflective pixel electrodes, and liquid crystals sealed between the reflective pixel electrodes and the counter electrode.

The reflective LCD has gate lines arranged for the rows of the pixels, respectively, and configured to be scanned in a scanning direction that is dependent on the usage of the reflective LCD. Each of the gate lines is connected to gate electrodes of the switching elements that are in a corresponding one of the rows of the pixels so that the gate lines may sequentially supply gate pulses to the rows of the pixels in the scanning direction.

The reflective LCD also has signal lines that are made from a metal film and are arranged for the columns of the pixels, respectively. Each of the signal lines is connected to drain electrodes (or source electrodes) of the switching elements in a corresponding one of the columns of the pixels so that the signal lines may sequentially supply video signals to the columns of the pixels.

The reflective LCD also has a connection line formed over two pixels that are adjacent to each other in the same column of the pixels.

A first end of the connection line is connected to a capacitor electrode contact of the storage capacitor formed in a first one of the two pixels and the reflective pixel electrode formed in the first pixel. A second end of the connection line crosses the gate line for the first pixel with an insulating film among the functional films being between the second end and the gate line and is connected to a source electrode (or a drain electrode) of the switching element formed in a second one of the two pixels.

A part of the connection line where the connection line crosses the gate line may be narrowed narrower than the part thereof extended into the first pixel and the part thereof extended into the second pixel.

The nature, principle and utility of the invention will become more apparent from the following detailed description when read in conjunction with the accompanying drawings.

BRIEF DESCRIPTION OF THE DRAWINGS

In the accompanying drawings:

FIGS. 2A and 2B are views explaining an active-matrix drive circuit in the reflective LCD of the related art 1, in which FIG. 2A is a block diagram showing the active-matrix drive circuit and FIG. 2B is an enlarged circuit diagram showing a transistor area shown in FIG. 2A;

FIGS. 7A and 7B are model views explaining the usage of the reflective LCD according to the related art 1, in which FIG. 7A shows overhead usage with a vertical shift register circuit scanning gate lines in a scanning direction U and FIG. 7B shows desktop usage with the vertical shift register circuit scanning the gate lines in a scanning direction D;

FIGS. 8A and 8B are signal waveform diagrams explaining different feed-through characteristics of the pixel A due to different gate-line scanning directions in the reflective LCD of the related art 1, in which FIG. 8A shows a case with the gate-line scanning direction U and FIG. 8B shows a case with the gate-line scanning direction D;

FIG. 9 is a sectional view taken along an arrow line X-Y of FIG. 10, explaining a parasitic capacitor in a pixel A that is among pixels in a reflective LCD according to a first embodiment of the present invention and is arranged adjacent to a pixel B in a column direction in the same column;

FIGS. 11A and 11B are signal waveform diagrams explaining substantially the same feed-through characteristics of the pixel A with respect to different gate-line scanning directions in the reflective LCD of the first embodiment, in which FIG. 11A shows a case with the gate-line scanning direction U and FIG. 11B shows a case with the gate-line scanning direction D;

FIGS. 15A and 15B are signal waveform diagrams explaining substantially the same feed-through characteristics of the pixel A with respect to different gate-line scanning directions in the reflective LCD of the second embodiment, in which FIG. 15A shows a case with the gate-line scanning direction U and FIG. 15B shows a case with the gate-line scanning direction D.

DETAILED DESCRIPTION OF EMBODIMENTS

Reflective LCDs according to the first and second embodiments of the present invention will be explained with reference to FIGS. 9 to 16.

<First Embodiment>

Figure 10:
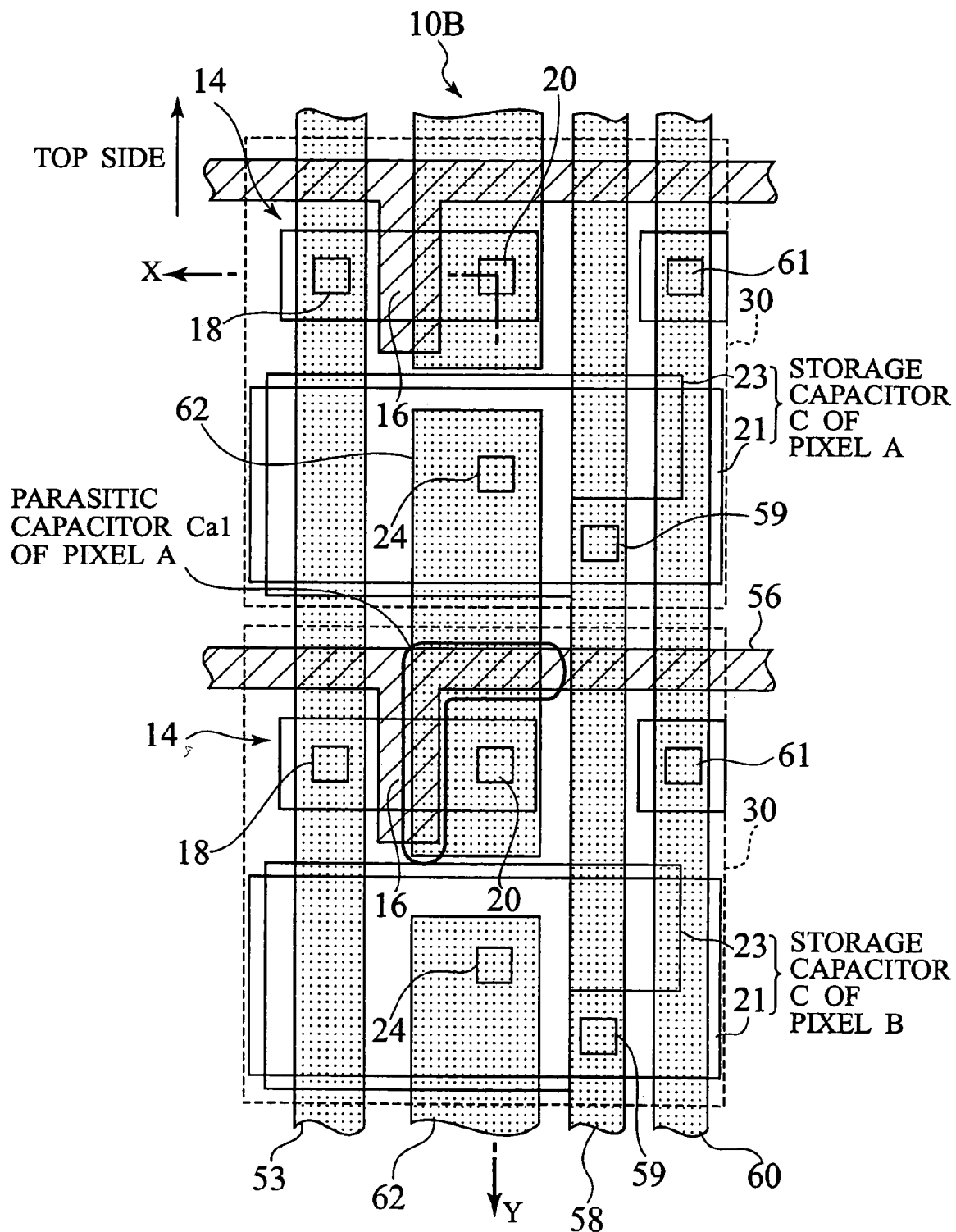
FIG. 10 is a plan view showing a semiconductor substrate (Si substrate) seen from a first metal film side along an arrow line X-Y of FIG. 9, explaining the parasitic capacitors in the pixel A that is among pixels in the reflective LCD of the first embodiment and is arranged adjacent to the pixel B in the column direction in the same column.
Figure 11A:
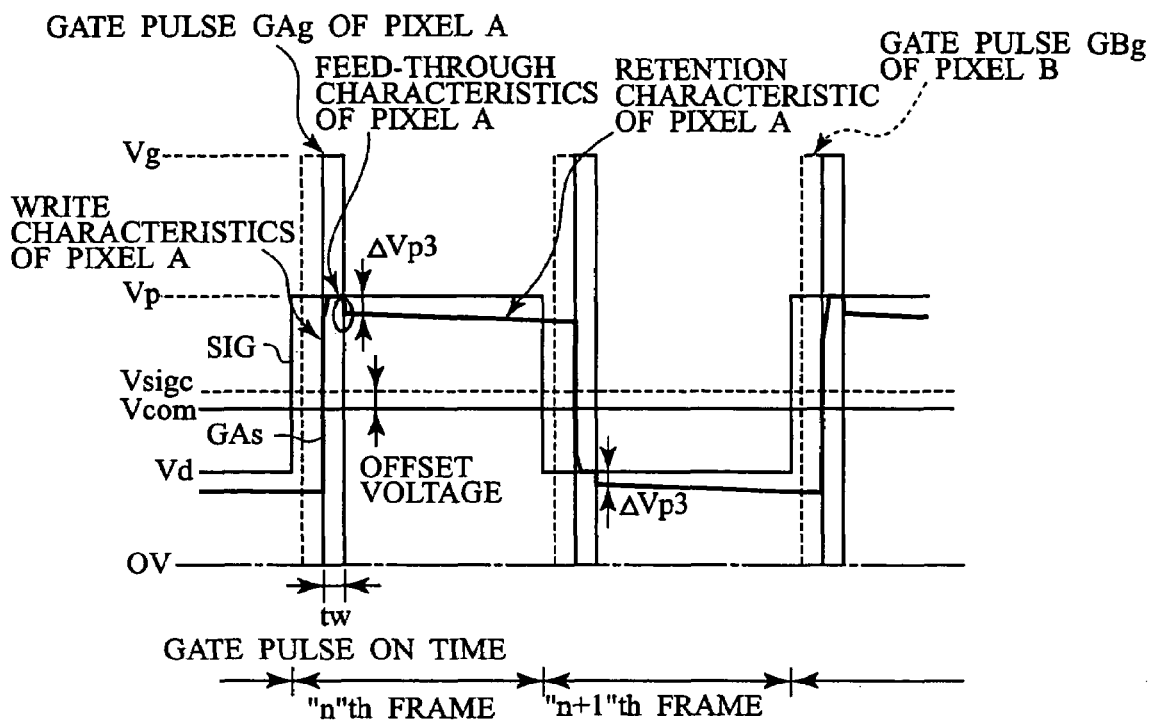
Figure 11B:
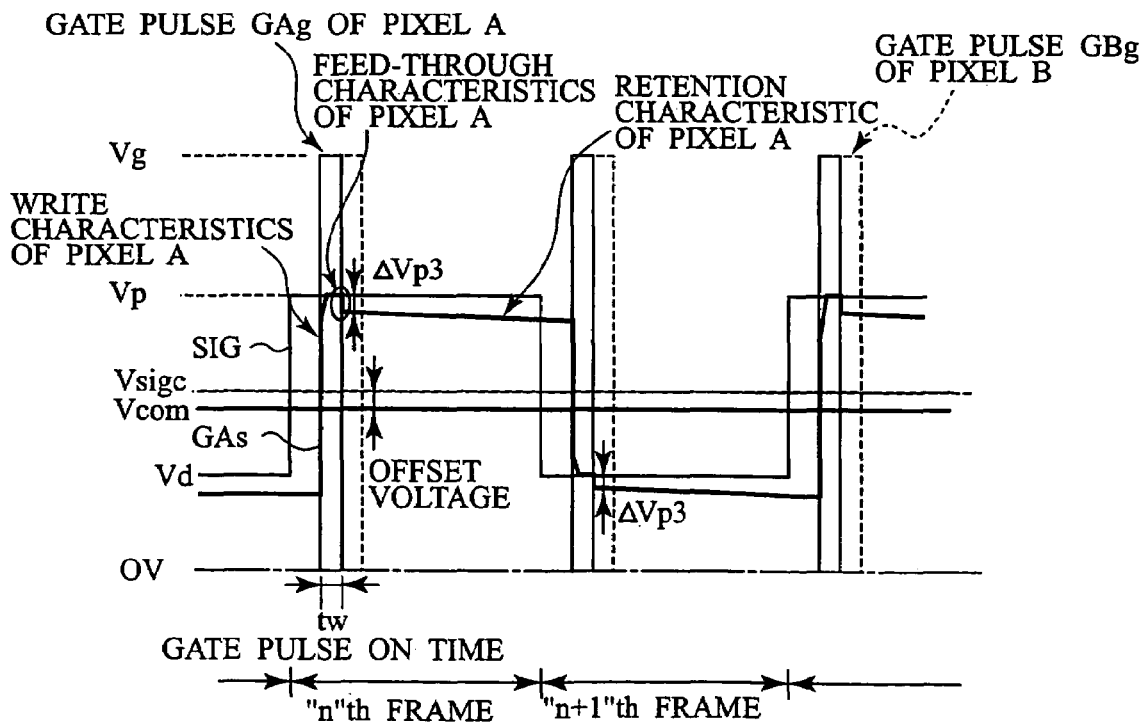

FIG. 9 is a sectional view taken along an arrow line X-Y shown in FIG. 10, showing a reflective LCD according to the first embodiment of the present invention. FIG. 9 explains a parasitic capacitor produced in a pixel A among a plurality of pixels. The pixel A is arranged adjacent to a pixel B in a column direction in the same column. FIG. 10 is a plan view showing a semiconductor substrate (Si substrate) seen from a first metal film side along an arrow line X-Y shown in FIG. 9, explaining the parasitic capacitor produced in the pixel A that is arranged adjacent to the pixel B in the column direction in the same column. FIG. 11A and 11B are signal waveform diagrams explaining substantially the same feed-through characteristics of the pixel A with respect to different gate-line scanning directions in the reflective LCD of the first embodiment, in which FIG. 11A shows a case with a gate-line scanning direction U and FIG. 11B shows a case with a gate-line scanning direction D.

Figure 4:
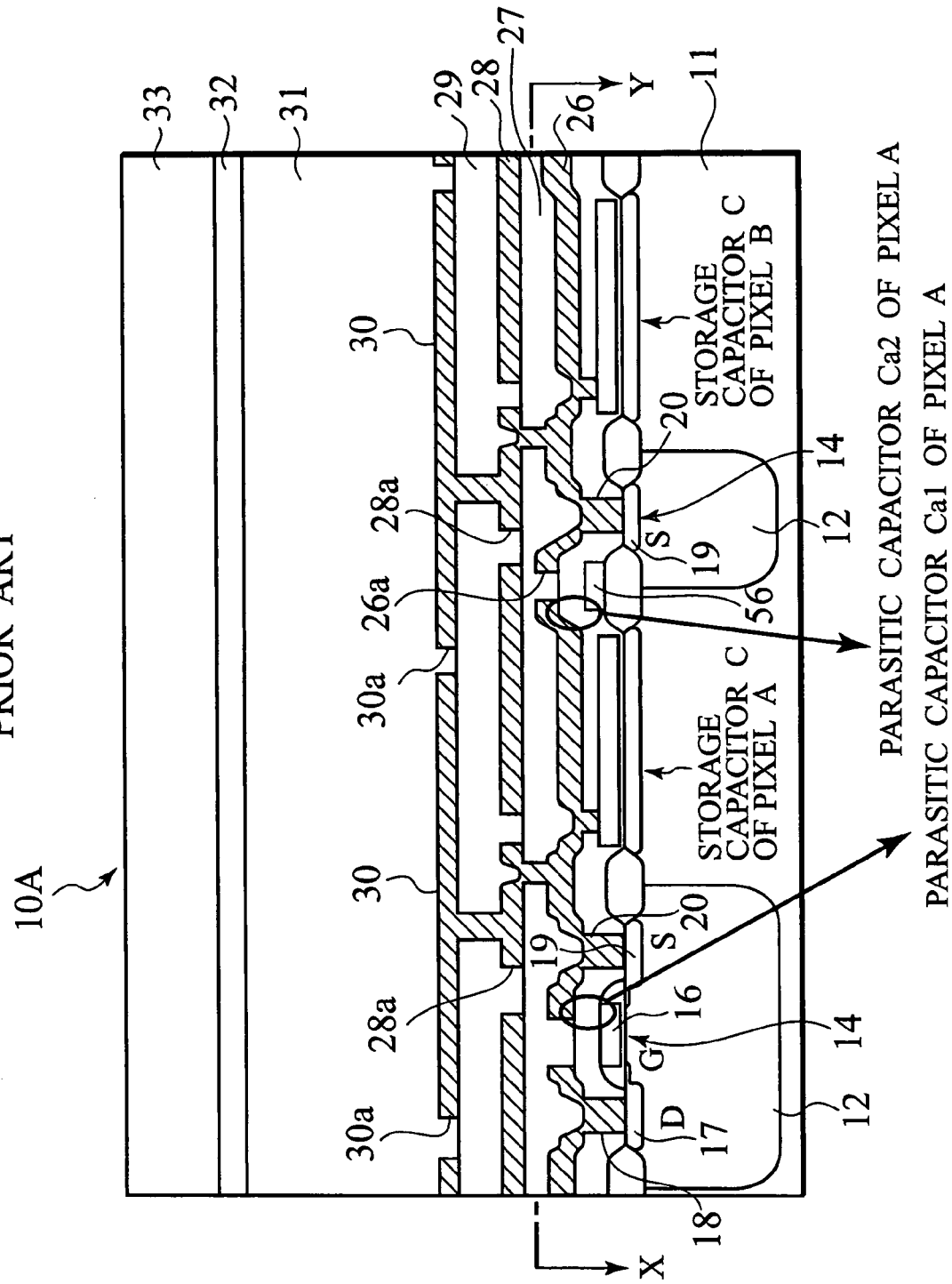
FIG. 4 is a sectional view taken along the arrow line X-Y of FIG. 5, explaining the parasitic capacitors in the pixel A that is among pixels in the reflective LCD of the related art 1 and is arranged adjacent to the pixel B in the column direction in the same column.
Figure 5:
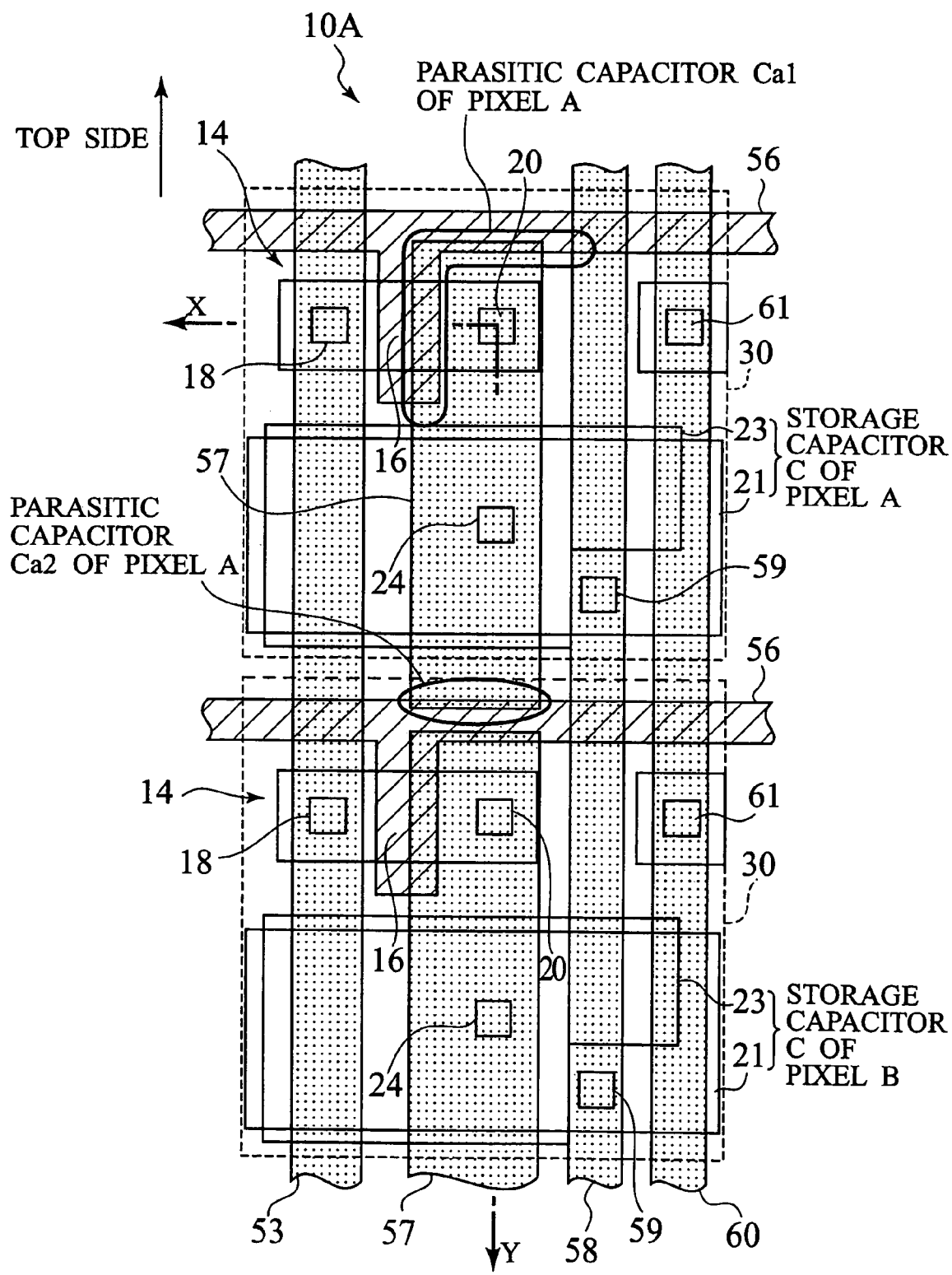
FIG. 5 is a plan view showing a semiconductor substrate (Si substrate) seen from a first metal film side along an arrow line X-Y of FIG. 4, explaining the parasitic capacitors in the pixel A that is among pixels in the reflective LCD of the related art 1 and is arranged adjacent to the pixel B in the column direction in the same column.
Figure 6:
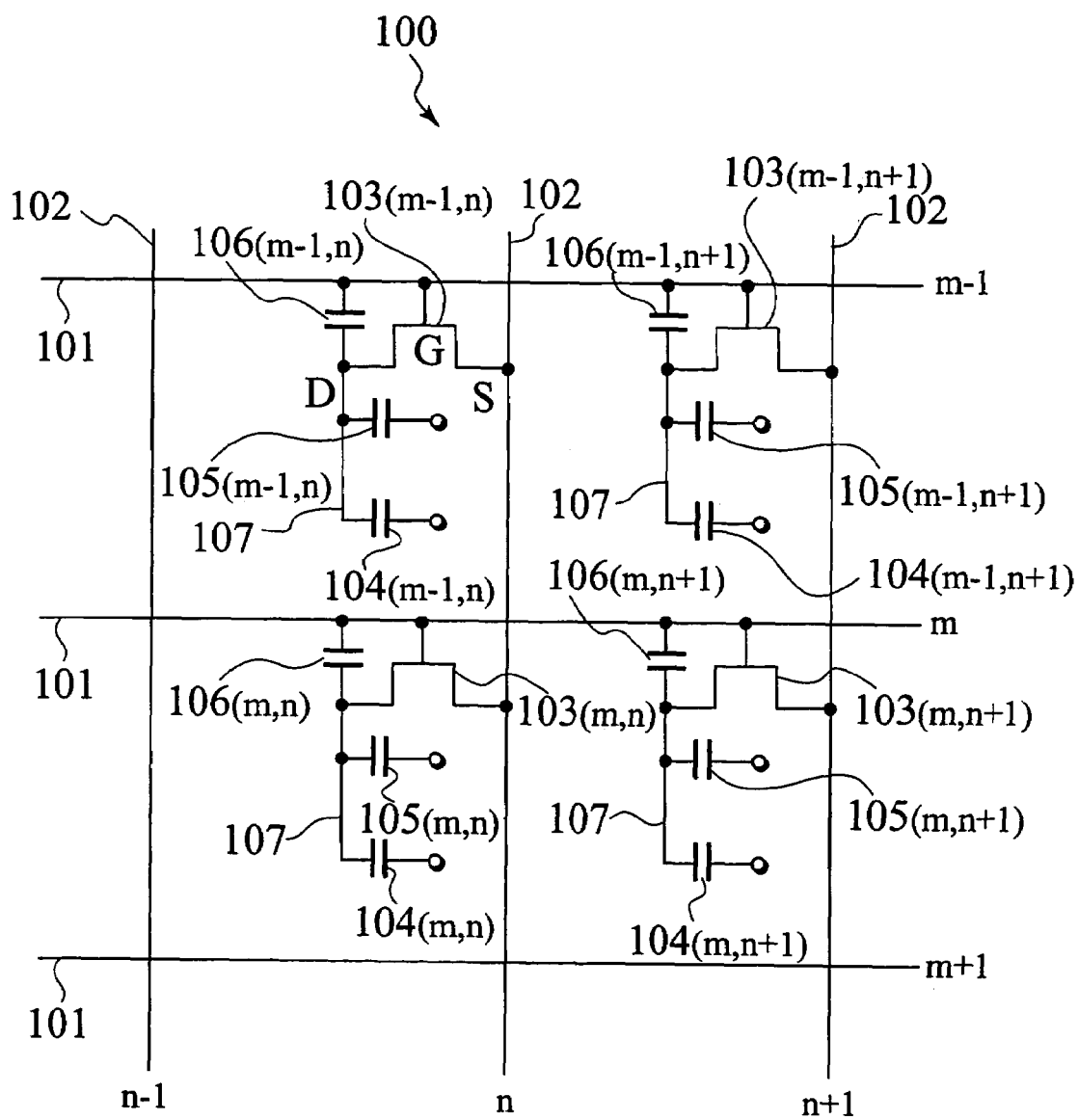
FIG. 6 is an equivalent circuit diagram showing an active-matrix LCD according to the related art 2.
Figure 7A:
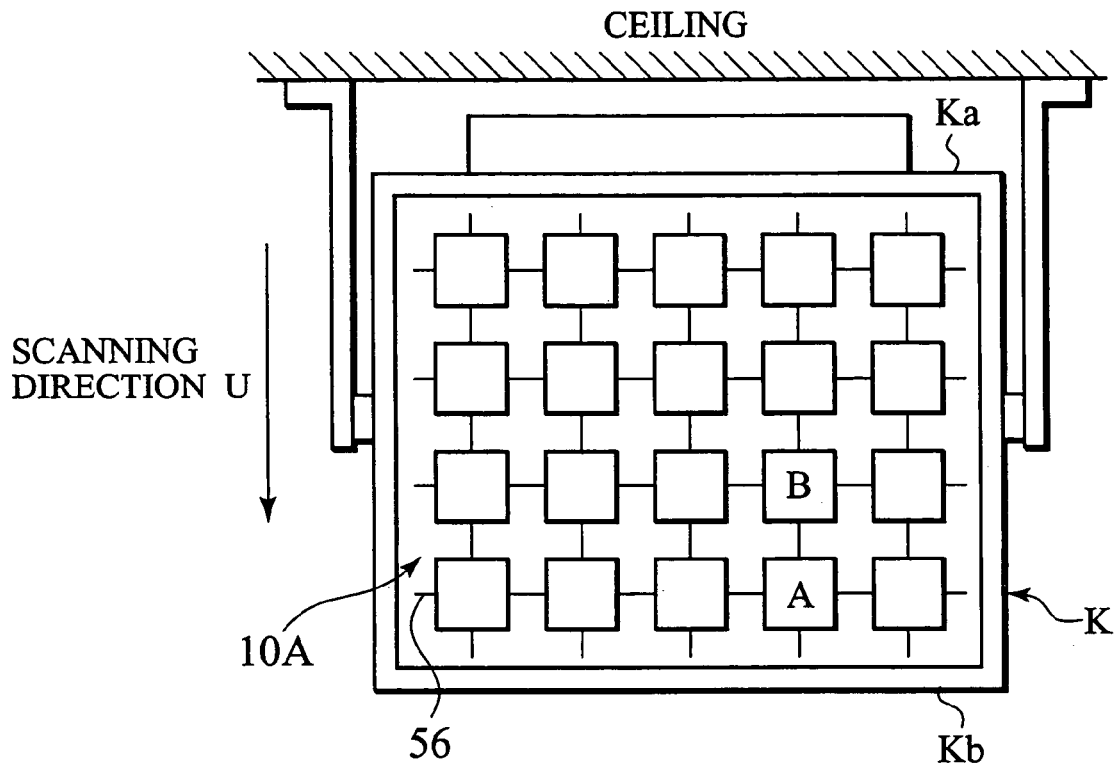
Figure 7B:
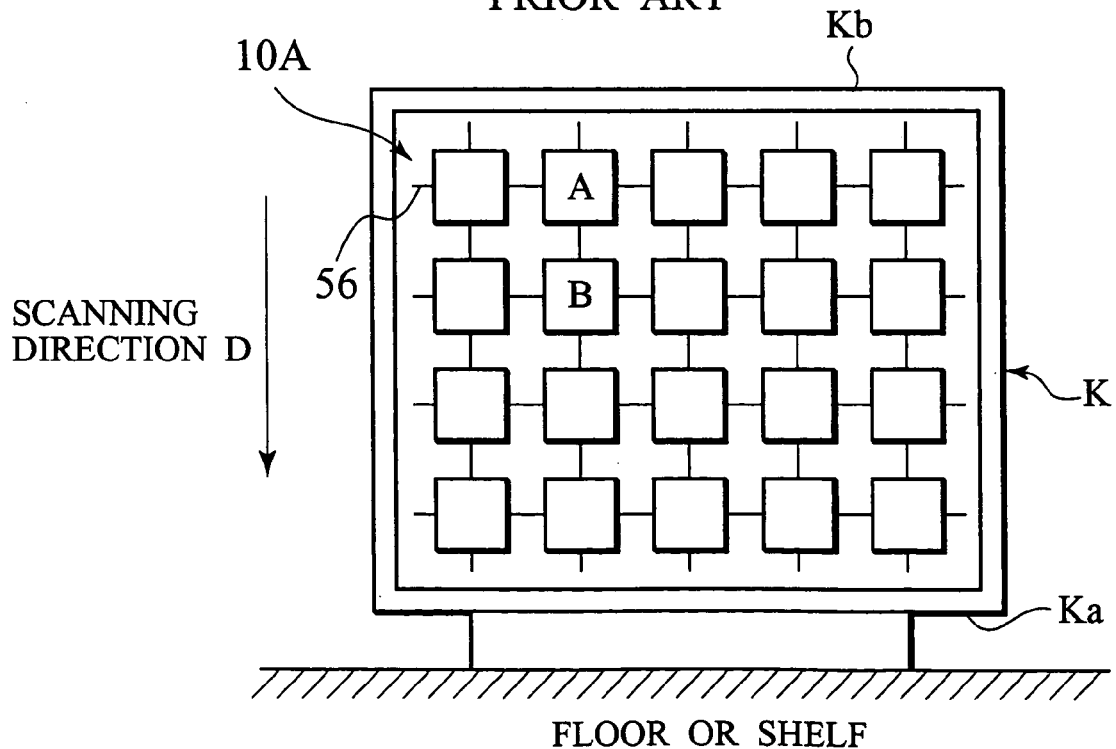

The structure of the reflective LCD 10B of the first embodiment shown in FIGS. 9 and 10 partly differs from the structure of the reflective LCD 10A of the related art 1 explained with reference to FIGS. 4 and 5.

The reflective LCD 10B of the first embodiment changes the scanning direction of gate lines 56 according to usage (for example, overhead usage or desktop usage). The gate lines 56 are used to supply gate pulses in a scanning direction from row to row. Each gate line 56 is made of polysilicon wiring and is connected to gate electrodes 16 of switching elements (hereinafter referred to as MOSFETs) 14 arranged along the corresponding row. Signal lines 53 sequentially supply video signals from column to column. Each signal line 53 is wiring made from a metal film and is connected to drain electrodes 18 (or source electrodes 20) of the MOSFETs 14 arranged along the corresponding column. A connection line 62 is formed over the two pixels A and B that are arranged adjacent to each other in the same column. A first end of the connection line 62 is connected to a capacitor electrode contact 24 of a storage capacitor C formed in the pixel A and to a reflective pixel electrode 30 formed in the pixel A. A second end of the connection line 62 crosses the gate line 56 for the pixel A with an insulating film 25 among functional films being between the connection line 62 and the gate line 56 and is connected to a source electrode 20 (or drain electrode 18) of a MOSFET 14 formed in the pixel B. This configuration minimizes the influence of the feed-through characteristics of the pixel A caused by the difference between the scanning direction U (in the case of the overhead usage) and the scanning direction D (in the case of the desktop usage) of the gate lines 56 as explained in the related art 1.

For the sake of convenience of explanation, the same parts as those of the reflective LCD 10A of the related art 1 are represented with like reference numerals in FIGS. 9 to 16. Such same parts will be explained as and when needed. Parts that are different from those of the related art 1 are represented with new reference numerals and will mainly be explained.

In FIGS. 9 and 10, the reflective LCD 10B according to the first embodiment of the present invention includes a semiconductor substrate (hereinafter referred to as Si substrate) 11 on which MOSFETs (switching elements) 14 and storage capacitors C for the MOSFETs are formed. The MOSFETs 14 and storage capacitors C are electrically isolated pixel by pixel. Over the MOSFETs 14 and storage capacitors C, a plurality of functional films are formed one upon another. The top one of the functional films is a metal film forming reflective pixel electrodes 30 that are electrically isolated from one another. One MOSFET 14, one storage capacitor C connected to the MOSFET 14, and one reflective pixel electrode 30 connected to the MOSFET 14 form a pixel. The pixels are arranged in rows and columns to form a matrix on the Si substrate 11. Facing the reflective pixel electrodes 30, a transparent counter electrode 32 is formed on the reverse of a transparent substrate 33. Between the reflective pixel electrodes 30 and the counter electrode 32, liquid crystals 31 are sealed. These arrangements are the same as those of the related art 1.

The signal line 53, a common line 58, and a well line 60 common for the pixels A and B in the same column are the same as those of the related art 1, and therefore, will not be explained in detail.

The difference of the first embodiment from the related art 1 will be explained. In FIG. 10, the pixel A is arranged on the top side of the reflective LCD 10B, and the pixel B is arranged adjacent to and on the lower side of the pixel A in the same column where the pixel A is arranged. In each pixel, the MOSFET 14 is arranged at an upper part and the storage capacitor C is arranged at a lower part. The gate line 56 for the pixel A to supply a gate pulse to the pixel A is connected to the gate electrode 16 of the MOSFET 14 that is for the pixel A and is arranged under the reflective pixel electrode 30 of the pixel B.

The connection line 62 of the pixel A extends over the first and second pixels A and B in a column direction (vertical direction) to drive the pixel. The connection line 62 has a uniform width.

Figure 1:
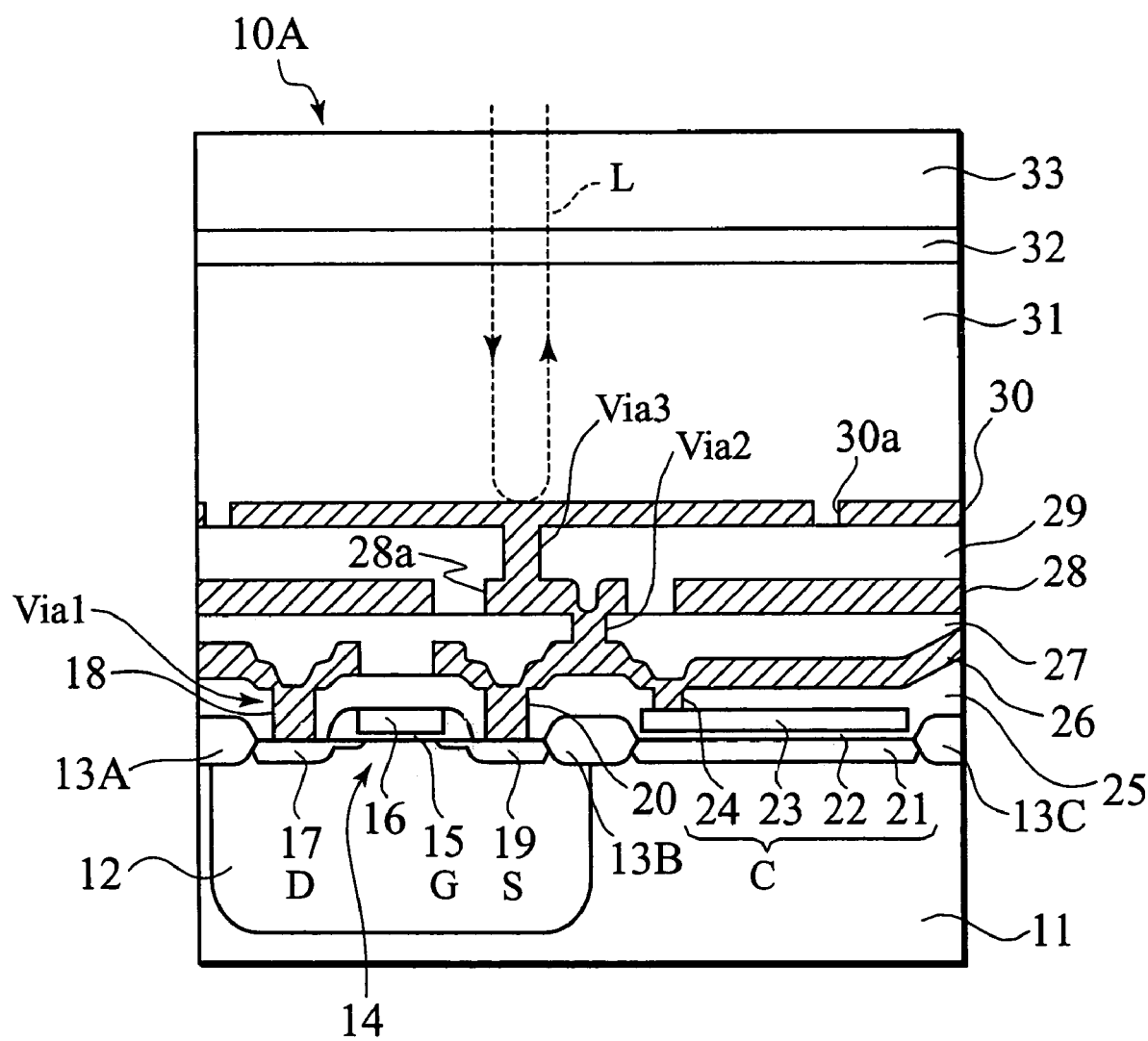
FIG. 1 is a sectional view taken along an arrow line X-Y of FIG. 5, showing an enlarged model of a pixel in a reflective LCD according to the related art 1.
Figure 2A:
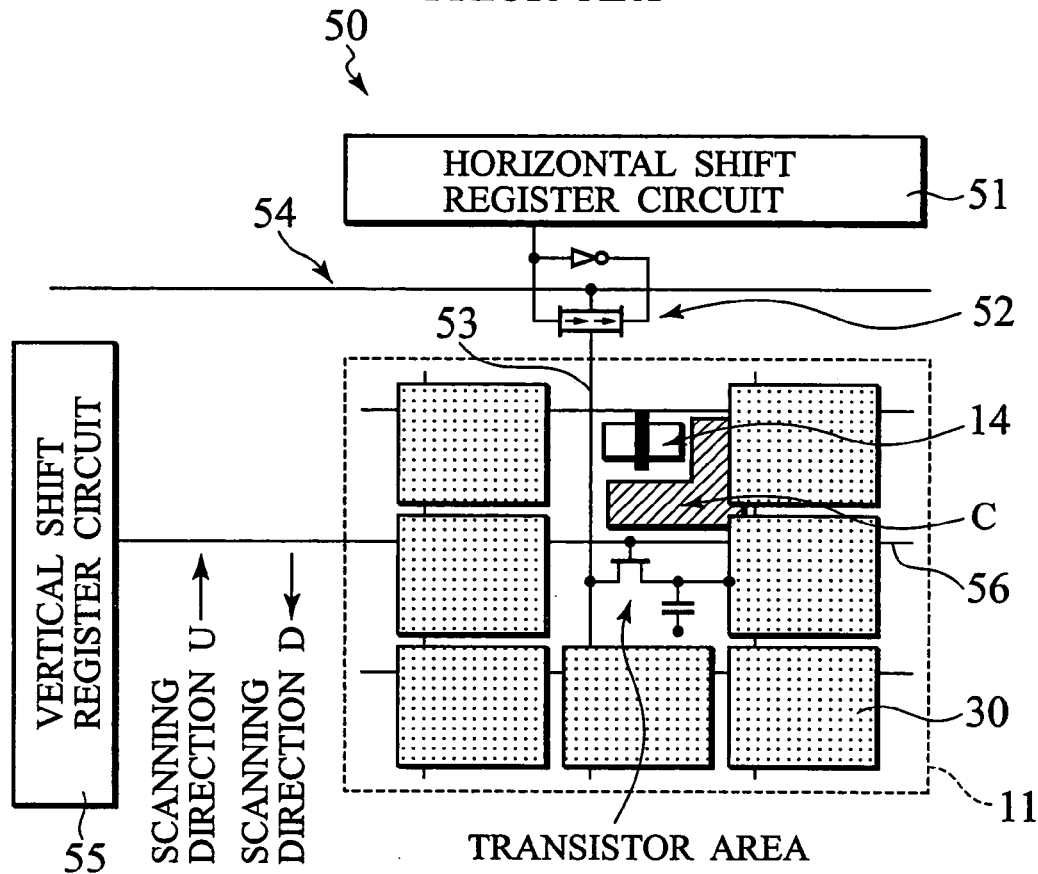
Figure 2B:
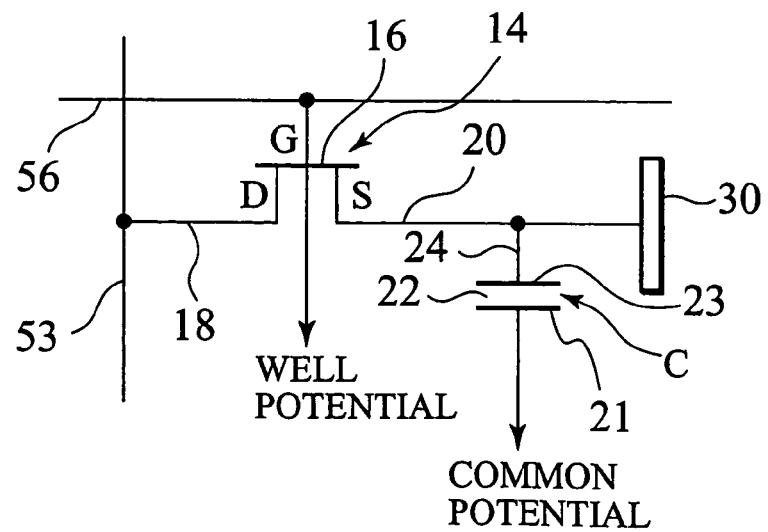
Figure 3:
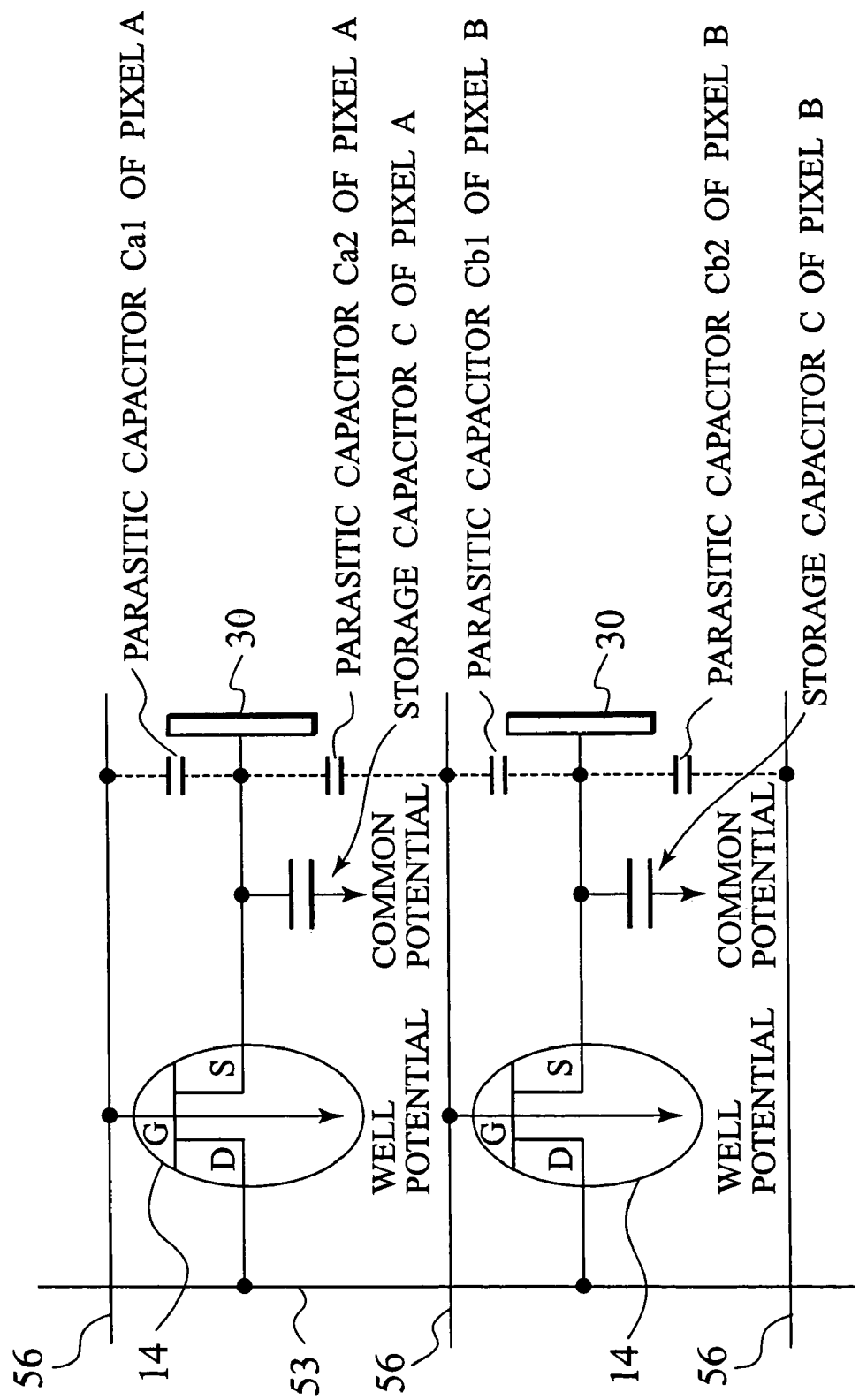
FIG. 3 is a circuit diagram explaining parasitic capacitors in pixels A and B that are among pixels in the reflective LCD of the related art 1 and are arranged adjacent to each other in a column direction in the same column.

The connection line 62 of the pixel A has a first end extended into the pixel A and connected to the capacitor electrode contact 24 of the storage capacitor C formed in the pixel A and to the reflective pixel electrode 30 formed in the pixel A through first and second metal films 26 and 28. A second end of the connection line 62 is extended into the pixel B, crosses the gate line 56 for the pixel A with a first interlayer insulating film 25 (FIG. 1) among the functional films being between the connection line 62 and the gate line 56, and is connected to the source electrode 20 of the MOSFET 14 formed in the pixel B.

When driving the pixel A, the storage capacitor C arranged under the reflective pixel electrode 30 of the pixel A, the reflective pixel electrode 30 of the pixel A, and the MOSFET 14 of the pixel A arranged under the reflective pixel electrode 30 of the pixel B are grouped.

Although not completely shown in FIG. 10, the pixel B is driven like the pixel A, by grouping the storage capacitor C arranged under the reflective pixel electrode 30 of the pixel B, the reflective pixel electrode 30 of the pixel B, and the MOSFET 14 of the pixel B formed under the reflective pixel electrode 30 of a pixel C (not shown).

As shown in FIG. 9, the MOSFET 14 arranged under the reflective pixel electrode 30 of the pixel A and the MOSFET 14 arranged under the reflective pixel electrode 30 of the pixel B are electrically isolated from each other with an opening 26b formed in the first metal film 26 and substantially having a thin square ring shape. The MOSFET 14 formed under the reflective pixel electrode 30 of the pixel A is for a pixel that is adjacent to and on the upper side of the pixel A. The MOSFET 14 formed under the reflective pixel electrode 30 of the pixel B is for the pixel A as mentioned above.

With the above-mentioned wiring, a parasitic capacitor Ca1 is produced as shown in FIG. 10 in the pixel A at a part (overlapping part) where the gate line 56 for the pixel A depicted with a hatched section overlaps the connection line 62 of the pixel A depicted with a dotted section. There is no part (no overlapping part) where the gate line 56 (not shown) of the pixel B overlaps the connection line 62 of the pixel A, and therefore, no parasitic capacitor Ca2 grows in the pixel A unlike the related art 1.

Like the pixel A, the pixel B produces a parasitic capacitor Cb1 although not shown in FIGS. 9 and 10, and no parasitic capacitor Cb2 grows in the pixel B.

Figure 8A:
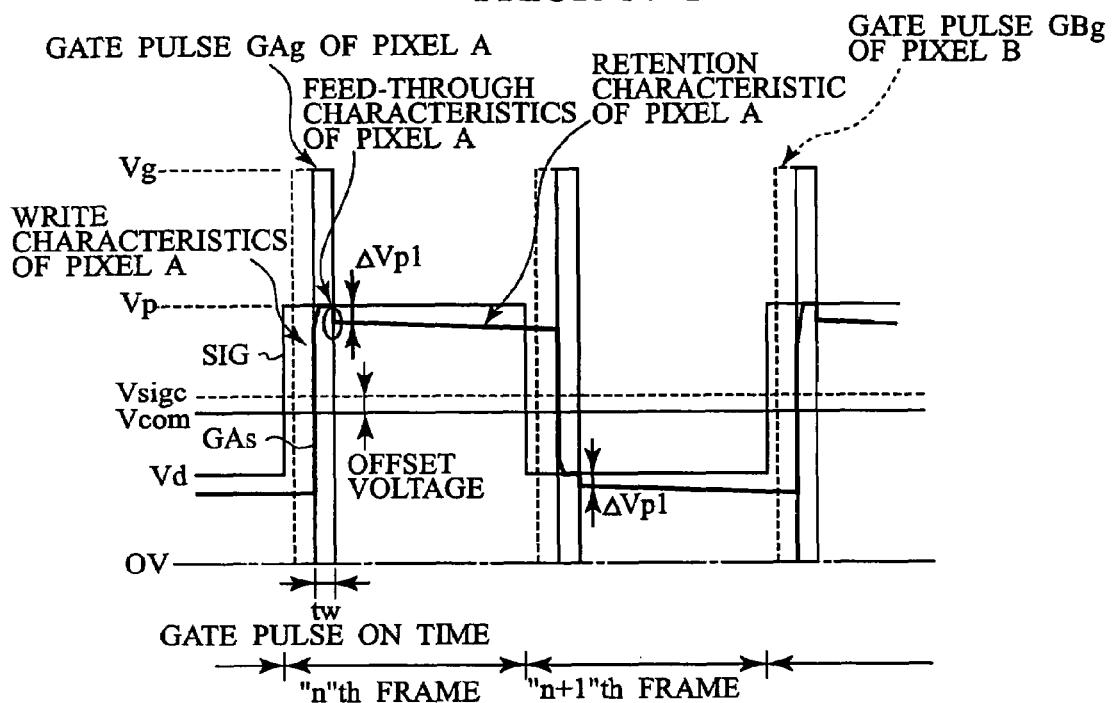
Figure 8B:
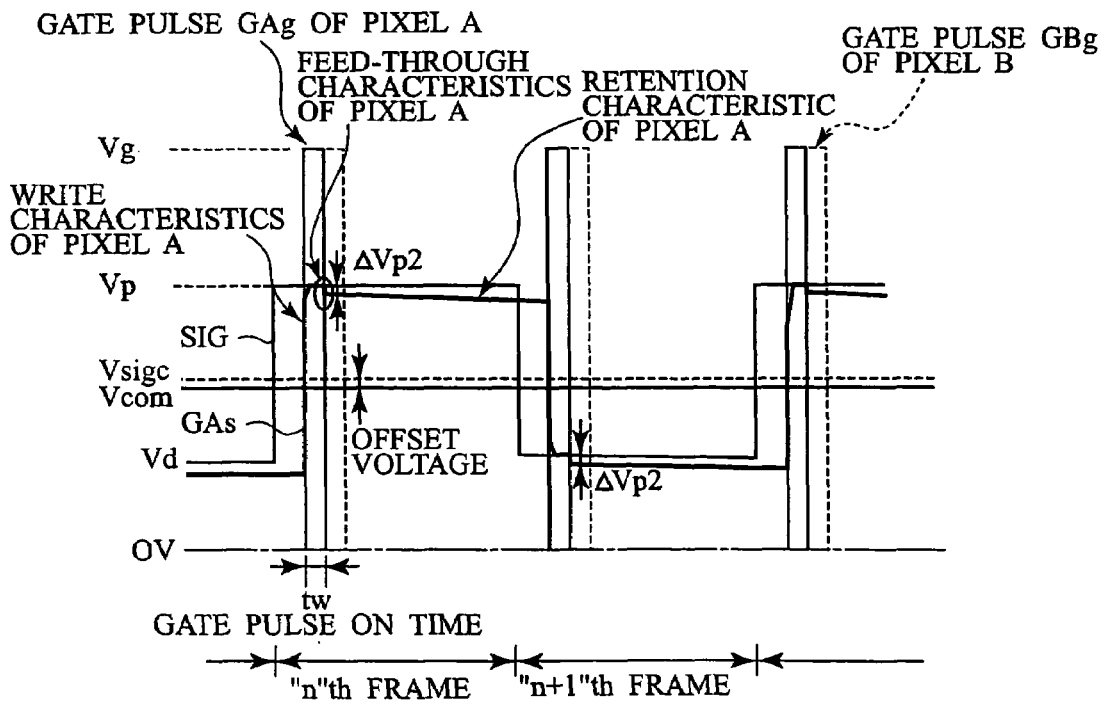

FIG. 11A is a waveform diagram showing a drive voltage applied to the pixel electrode of the pixel A when scanning the gate lines 56 in the scanning direction U in the pixel layout of the first embodiment. FIG. 11B is a waveform diagram showing a drive voltage applied to the pixel electrode of the pixel A when scanning the gate lines 56 in the scanning direction D. The operation of the waveforms of FIGS. 11A and 11B has already been explained with reference to FIGS. 8A and 8B, and therefore, only the difference of the first embodiment from the related art 1 will be explained.

According to the pixel layout of the first embodiment of the present invention, the pixel A produces no parasitic capacitor Ca2, and therefore, a feed-through voltage ?Vp3 of the pixel A is dependent only on the parasitic capacitor Ca1 of the pixel A. The feed-through voltage ?Vp3 of the pixel A is unchanged during a driving operation between the scanning direction U of FIG. 11A and the scanning direction D of FIG. 11B. Accordingly, the reflective LCD 10B is usable for the overhead usage and desktop usage.

Once a counter electrode potential Vcom is corrected for an offset potential to secure a positive-negative balance, the feed-through voltage ?Vp3 is unchanged irrespective of a change in the scanning direction of the gate lines 56, thereby solving the problems of the flickering and burning of the liquid crystals 31 (FIG. 9).

The first embodiment employs the known frame inversion driving method. To input a video signal through the signal line 53, the signal line 53 may be connected to any one of the drain electrode 18 and source electrode 20 of the MOSFET 14. In this embodiment, the signal line 53 is connected to the drain electrode 18 as mentioned above. If the signal line 53 is connected to the source electrode 20 of the MOSFET 14, the connection line 62 is connected to the drain electrode 18 of the MOSFET 14 and the capacitor electrode contact 24 of the storage capacitor C. The connection line 62 is also connected to the reflective pixel electrode 30 through the first and second metal films 26 and 28.

A partly modified form of the reflective LCD 10B of the first embodiment will be explained with reference to FIG. 12.

Figure 12:
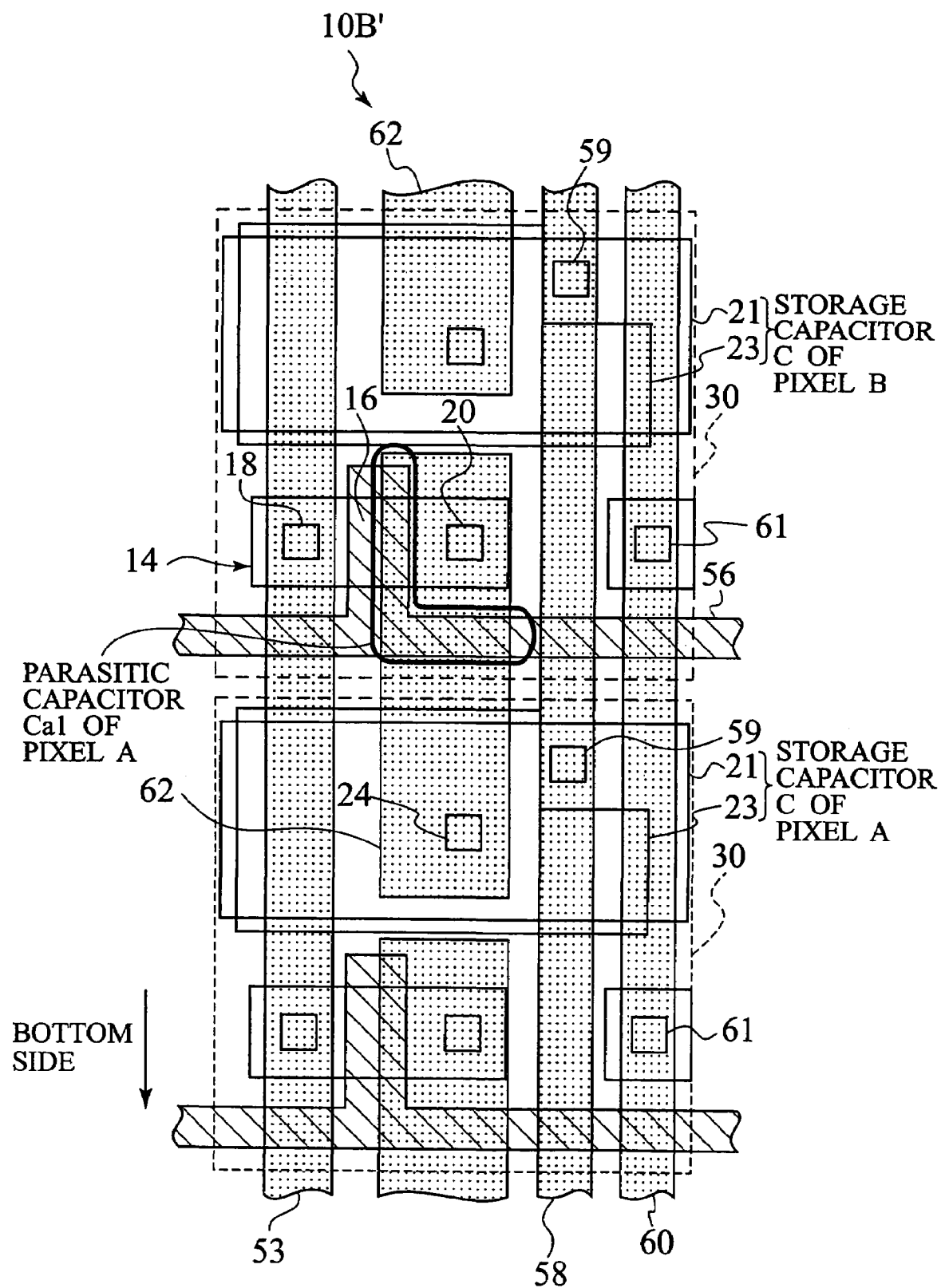
FIG. 12 is a plan view showing a semiconductor substrate (Si substrate) seen from a first metal film side, explaining a modification based on the reflective LCD of the first embodiment of the present invention.

FIG. 12 is a plan view showing a semiconductor substrate (Si substrate) seen from a first metal film side, explaining the modification partly modified from the reflective LCD of the first embodiment.

In FIG. 12, the reflective LCD 10B' partly modified from the reflective LCD 10B of the first embodiment has a pixel layout that is upside down relative to the pixel layout of the first embodiment. For example, a pixel A is arranged on the bottom side of the reflective LCD 10B' and a pixel B is arranged adjacent to and on the upper side of the pixel A in the same column. In each pixel, a storage capacitor C is arranged at an upper part, and a MOSFET 14 is arranged at a lower part. A connection line 62 of the pixel A extends over the first and second pixels A and B in a column direction (vertical direction) to drive the pixel. A first end of the connection line 62 is extended into the pixel A and is connected to a capacitor electrode contact 24 of the storage capacitor C formed in the pixel A and to a reflective pixel electrode 30 formed in the pixel A through first and second metal films 26 and 28. A second end of the connection line 62 is extended into the pixel B, crosses a gate line 56 for the pixel A with a first interlayer insulating film 25 (FIG. 1) among functional films being between the connection line 62 and the gate line 56, and is connected to a source electrode 20 of the MOSFET 14 formed in the pixel B.

When the reflective LCD 10B' of the modification is in the overhead usage, the gate lines 56 are scanned in the scanning direction U. In this case, contrary to the first embodiment, the pixels A and B are scanned in this order. When the reflective LCD 10B' is in the desktop usage, the gate lines 56 are scanned in the scanning direction D. In this case, contrary to the first embodiment, the pixels B and A are scanned in this order. Like the first embodiment, a feed-through voltage ?Vp3 (FIGS. 11A and 11B) of the pixel A is unchanged irrespective of the scanning direction of the gate lines 56. Accordingly, the reflective LCD 10B' is applicable to both the overhead usage and desktop usage.

<Second Embodiment>

Figure 13:
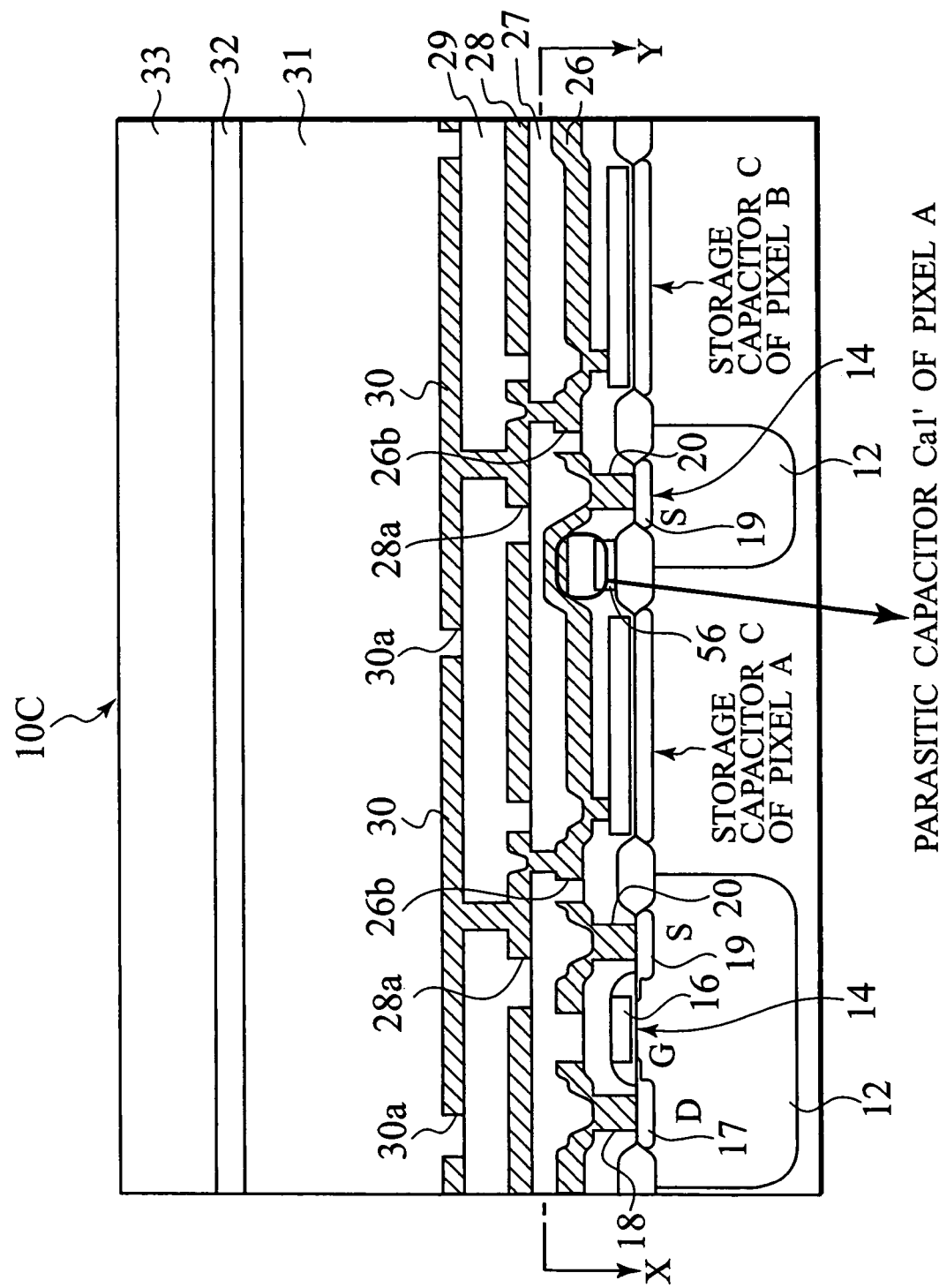
FIG. 13 is a sectional view taken along an arrow line X-Y of FIG. 14, explaining a parasitic capacitor in a pixel A that is among pixels in a reflective LCD according to a second embodiment of the present invention and is arranged adjacent to a pixel B in a column direction in the same column.
Figure 14:
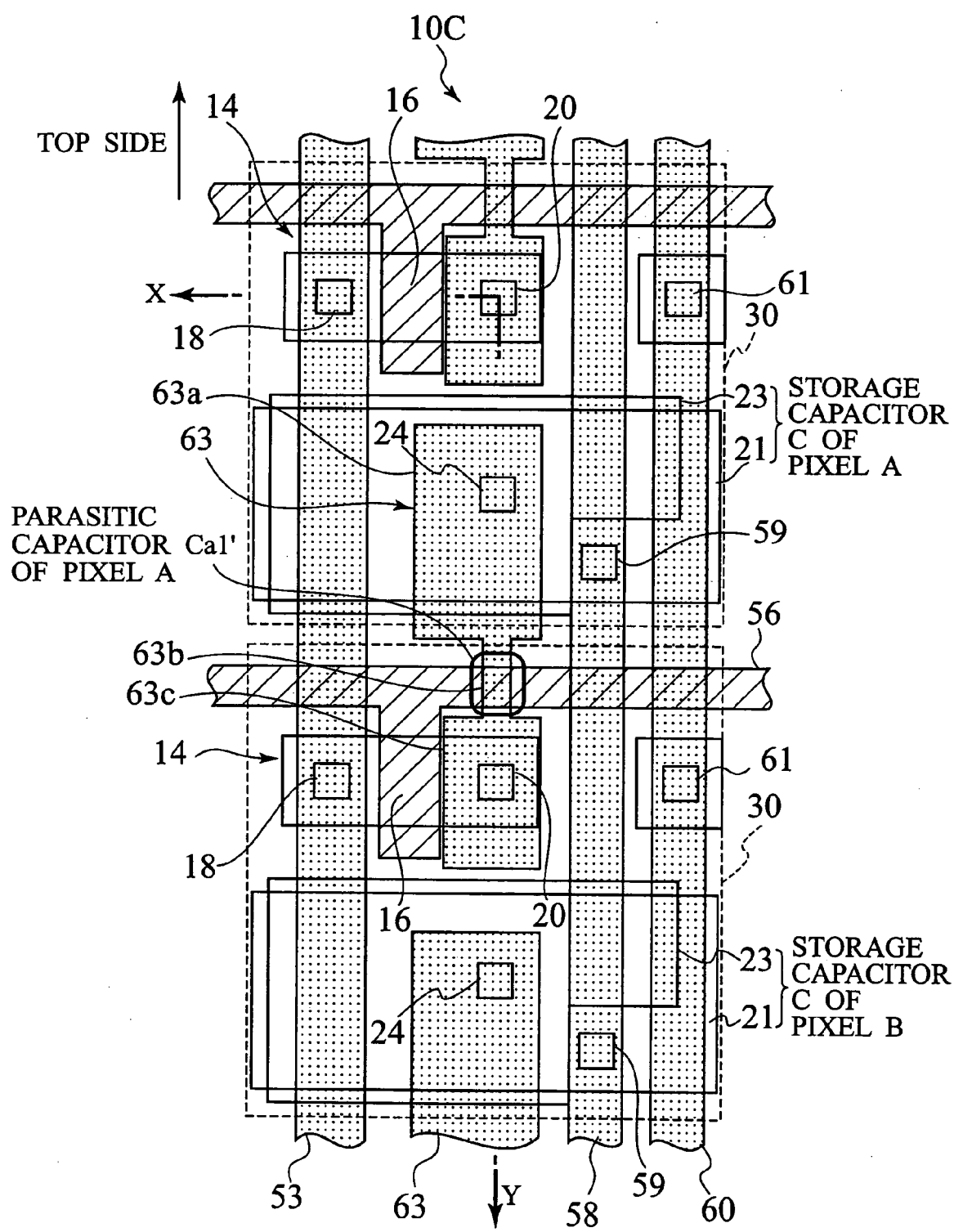
FIG. 14 is a plan view showing a semiconductor substrate (Si substrate) seen from a first metal film side along an arrow line X-Y of FIG. 13, explaining the parasitic capacitor in the pixel A that is among pixels in the reflective LCD of the second embodiment and is arranged adjacent to the pixel B in the column direction in the same column.
Figure 15A:
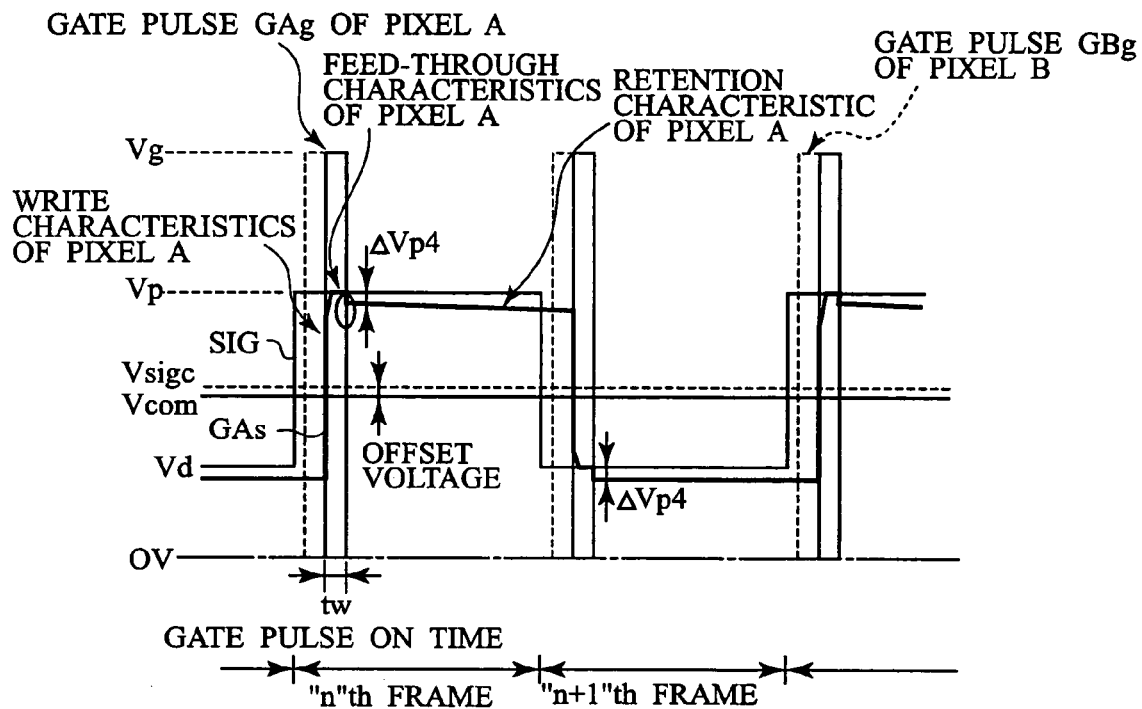
Figure 15B:
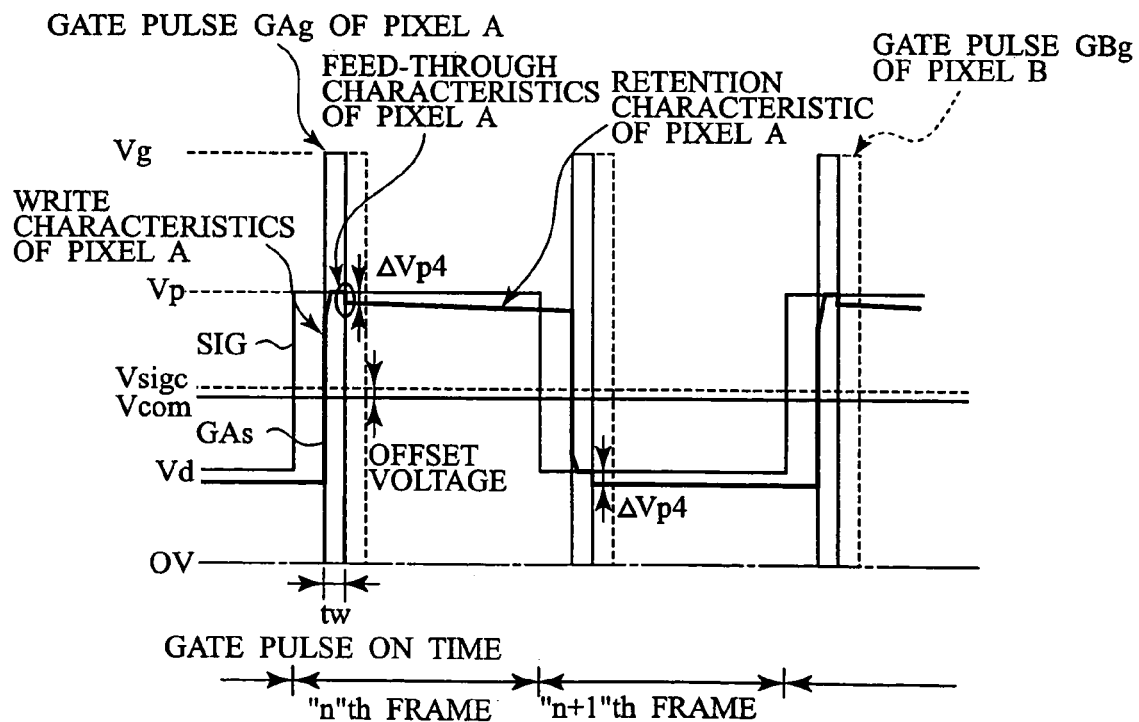

FIG. 13 is a sectional view taken along an arrow line X-Y shown in FIG. 14, explaining a parasitic capacitor generated in a pixel A in a reflective LCD according to the second embodiment of the present invention. Among a plurality of pixels, the pixel A is arranged adjacent to a pixel B in a column direction in the same column. FIG. 14 is a plan view showing a semiconductor substrate (Si substrate) seen from a first metal film side along an arrow line X-Y shown in FIG. 13, explaining the parasitic capacitor of the pixel A in the reflective LCD of the second embodiment. Among the plurality of pixels, the pixels A and B are arranged adjacent to each other in the same column. FIG. 15A and 15B are signal waveform diagrams explaining substantially the same feed-through characteristics of the pixel A with respect to different gate-line scanning directions in the reflective LCD of the second embodiment, in which FIG. 15A shows a case with the gate-line scanning direction U and FIG. 15B shows a case with the gate-line scanning direction D.

The structure of the reflective LCD 10C according to the second embodiment of the present invention shown in FIGS. 13 and 14 is partly different from that of the reflective LCD 10B of the first embodiment of the present invention shown in FIGS. 9 and 10.

According to the reflective LCD 10C of the second embodiment, the pixel A, for example, is arranged on the top side of the reflective LCD 10C in a given column, and the pixel B is arranged adjacent to and on the lower side of the pixel A in the column direction in the same column. In each pixel, a MOSFET 14 is arranged at an upper part, and a storage capacitor C is arranged at a lower part. A connection line 63 of the pixel A is extended over the pixels A and B in the column direction (vertical direction) to drive the pixel. The width of a part of the connection line 63 where the connection line 63 crosses a gate line 56 for the pixel A is narrower than the width of a part of the connection line 63 extended into the pixel A and the width of a part of the connection line 63 extended into the pixel B. This configuration is different from that of the first embodiment.

For the sake of convenience of explanation, the same parts as those of the reflective LCD 10A of the related art 1 and the reflective LCD 10B of the first embodiment are represented with like reference numerals. Parts that are different from those of the related art 1 and first embodiment are represented with new reference numerals, and such different parts will mainly be explained.

The parts different from those of the related art 1 and first embodiment will be explained in more detail. In the connection line 63 of the pixel A, a first end extended into the pixel A forms a wide part 63a. The wide part 63a is connected to a capacitor electrode contact 24 of a storage capacitor C formed in the pixel A and to a reflective pixel electrode 30 of the pixel A through first and second metal films 26 and 28. A second end of the connection line 63 forms a narrow part 63c extended into the pixel B. The narrow part 63c is slightly narrower than the wide part 63a. The narrow part 63c crosses the gate line 56 for the pixel A with a first interlayer insulating film 25 (FIG. 1) among functional films being between the narrow part 63c and the gate line 56 and is connected to the source electrode 20 of the MOSFET 14 formed in the pixel B. The narrow part 63c at the second end of the connection line 63 is slightly narrower than the wide part 63a at the first end of the connection line 63, so that the narrow part 63c may not overlap the gate line 56 for the pixel A on the source electrode 20 side of the MOSFET 14.

In addition, the connection line 63 of the pixel A has a contraction 63b at the part where the connection line 63 crosses the gate line 56 for the pixel A between the wide part 63a at the first end and the narrow part 63c at the second end. The width of the contraction 63b is narrower than the width of the wide part 63a of the first end extended into the pixel A and the width of the narrow part 63c at the second end extended into the pixel B.

When driving the pixel A, the storage capacitor C arranged under the reflective pixel electrode 30 of the pixel A, the reflective pixel electrode 30 of the pixel A, and the MOSFET 14 arranged for the pixel A under the reflective pixel electrode 30 of the pixel B are grouped.

Although not shown in FIG. 14, the pixel B is driven like the pixel A. Namely, the storage capacitor C arranged under the reflective pixel electrode 30 of the pixel B, the reflective pixel electrode 30 of the pixel B, and a MOSFET 14 arranged for the pixel B under the reflective pixel electrode 30 of a pixel C (not shown) are grouped.

With the above-mentioned wiring, the pixel A produces a parasitic capacitor Ca1' at the part (overlapping part) where the gate line 56 for the pixel A indicated with a hatched section overlaps the connection line 63 of the pixel A indicated with a dotted section. At the overlapping part, the narrow part 63c and contraction 63b of the connection line 63 are formed, to reduce the area of the overlapping part. This makes the value of the parasitic capacitor Ca1' of the pixel A smaller than the value of the parasitic capacitor Ca1 (FIGS. 9 and 10) of the pixel A of the first embodiment. According to the second embodiment, a gate line 56 (not shown) for the pixel B does not overlap the connection line 63 of the pixel A, and therefore, the pixel A generates no parasitic capacitor Ca2 unlike the related art 1.

Although not shown in FIGS. 13 and 14, the pixel B produces a parasitic capacitor Cb1' like the pixel A. However, the pixel B produces no parasitic capacitor Cb2.

With the pixel layout of the second embodiment, FIG. 15A is a waveform diagram showing a drive voltage applied to the pixel electrode of the pixel A when the gate lines 56 are scanned in the scanning direction U, and FIG. 15B is a waveform diagram showing a drive voltage applied to the pixel electrode of the pixel A when the gate lines 56 are scanned in the scanning direction D.

According to the pixel layout of the second embodiment, the pixel A produces no parasitic capacitor Ca2 as mentioned above. Accordingly, a feed-through voltage ?Vp4 of the pixel A is dependent only on the parasitic capacitor Ca1' of the pixel A and is unchanged when the pixel A is driven between the scanning direction U of FIG. 15A and the scanning direction D of FIG. 15B. The reflective LCD 10C, therefore, is applicable to both the overhead usage and desktop usage.

The value of the parasitic capacitor Ca1' of the pixel A is smaller than that of the first embodiment, and therefore, the influence of the parasitic capacitor Ca1' on a pixel electrode voltage is smaller, to thereby reduce the feed-through voltage ?Vp4 of the pixel A lower than that of the first embodiment.

The feed-through voltage ?Vp4 of the pixel A changes in response to the level of a signal voltage. If the feed-through voltage ?Vp4 of the pixel A is large, a counter electrode potential Vcom will be insufficient to cancel the feed-through voltage, and a DC component will be produced in the liquid crystals 31 (FIG. 13). The feed-through voltage ?Vp4 of the pixel A, however, is small to surely prevent the burning and flickering of the liquid crystals 31.

The second embodiment employs the known frame inversion driving method. To input a video signal through a signal line 53, the signal line 53 is connected to any one of the drain electrode 18 and source electrode 20 of a MOSFET 14. In this embodiment, the signal line 53 is connected to the drain electrode 18 as mentioned above. If the signal line 53 is connected to the source electrode 20 of the MOSFET 14, the connection line 63 is connected to the drain electrode 18 of the MOSFET 14 and the capacitor electrode contact 24 of the storage capacitor C. The connection line 63 is also connected to the reflective pixel electrode 30 through the first and second metal films 26 and 28.

A modification partly modified from the reflective LCD 10C of the second embodiment will briefly be explained with reference to FIG. 16.

Figure 16:
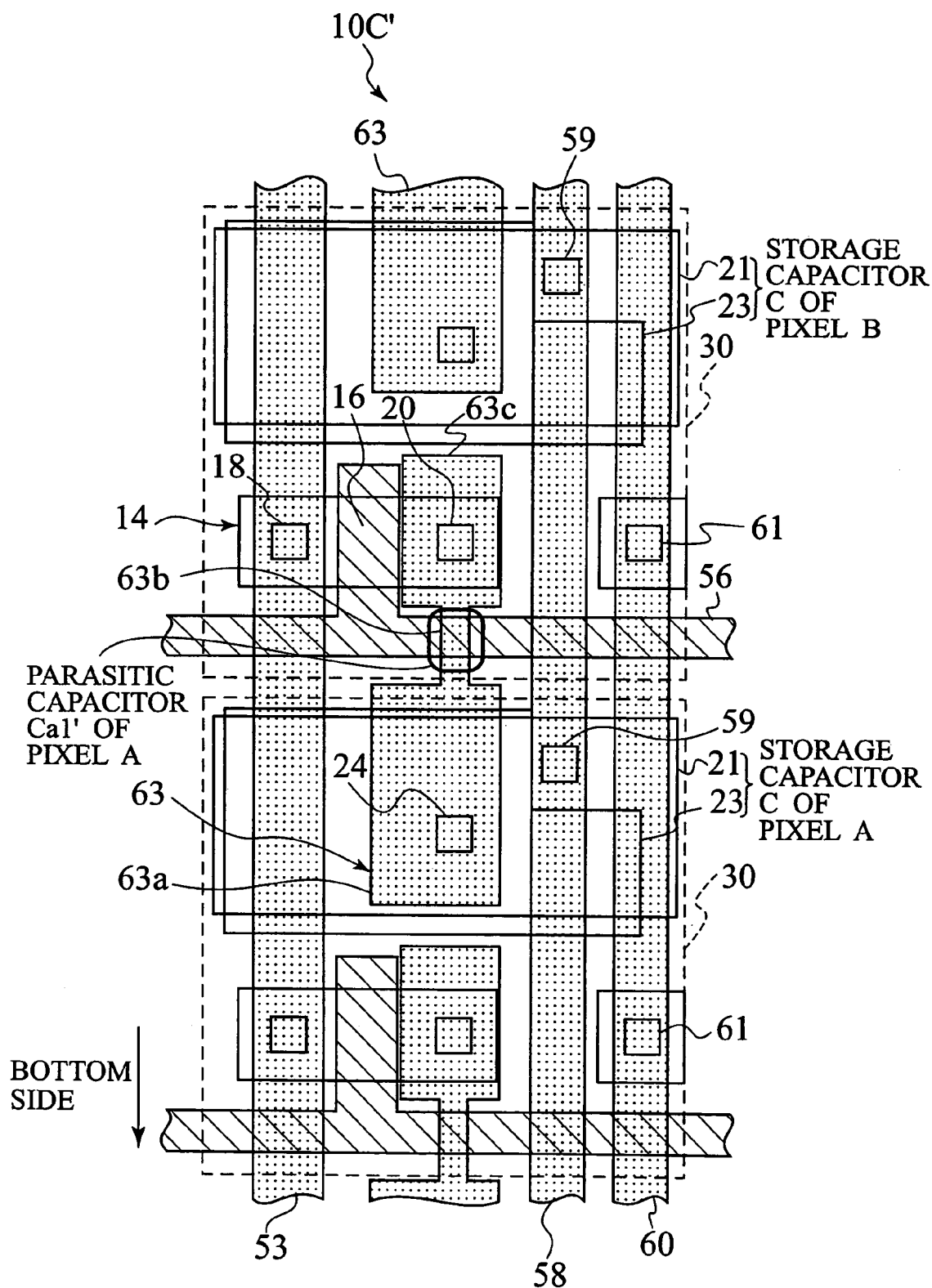
FIG. 16 is a plan view showing a semiconductor substrate (Si substrate) seen from a first metal film side, explaining a modification based on the reflective LCD of the second embodiment of the present invention.

FIG. 16 is a plan view showing a semiconductor substrate (Si substrate) seen from a first metal film side, explaining the modification partly modified from the reflective LCD of the second embodiment.

In FIG. 16, the reflective LCD 10C' partly modified from the reflective LCD 10B of the second embodiment has a pixel layout that is upside down relative to the pixel layout of the second embodiment. For example, a pixel A is arranged on the bottom side of the reflective LCD 10C', and a pixel B is arranged adjacent to and on the upper side of the pixel A in a column direction in the same column. In each pixel, a storage capacitor C is arranged at an upper part, and a MOSFET 14 is arranged at a lower part. A connection line 63 of the pixel A is extended over the pixels A and B in a column direction (vertical direction) to drive the pixel with a part of the connection line 63 between the pixels A and B being narrowed. A first end of the connection line 63 is extended into the pixel A and is connected to a capacitor electrode contact 24 of a storage capacitor C formed in the pixel A and to a reflective pixel electrode 30 of the pixel A through first and second metal films 26 and 28. A second end of the connection line 63 is extended into the pixel B, crosses a gate line 56 for the pixel A with a first interlayer insulating film 25 (FIG. 1) among functional films being between the connection line 63 and the gate line 56, and is connected to a source electrode 20 of the MOSFET 14 formed in the pixel B.

When the reflective LCD 10C' of the modification is in the overhead usage, the gate lines 56 are scanned in the scanning direction U. In this case, contrary to the second embodiment, the pixels A and B are scanned in this order. When the reflective LCD 10C' is in the desktop usage, the gate lines 56 are scanned in the scanning direction D. In this case, contrary to the second embodiment, the pixels B and A are scanned in this order. Like the second embodiment, a feed-through voltage ?Vp4 (FIGS. 15A and 15B) of the pixel A is unchanged irrespective of the scanning direction of the gate lines 56. Accordingly, the reflective LCD 10C' is applicable to both the overhead usage and desktop usage.

As explained above in detail, the reflective LCD according to the present invention can be constituted to change the scanning direction of gate lines depending on the usage (for example, overhead usage or desktop usage) of the reflective LCD. In the reflective LCD, first and second pixels are arranged adjacent to each other in a column direction in the same column, and a connection line is formed over the two pixels that are adjacent to each other in the same column. A first end of the connection line is connected to a capacitor electrode contact of a storage capacitor formed in the first pixel and to a reflective pixel electrode formed in the first pixel. A second end of the connection line is extended over a gate line for the first pixel with an insulating film among functional films being between the connection line and the gate line and is connected to a source electrode (or drain electrode) of a switching element formed in the second pixel. Even if a vertical shift register changes the scanning directions U and D of gate lines from one to another, the feed-through characteristics of each pixel are substantially unchanged irrespective of the scanning direction of the gate lines, to thereby prevent the flickering and burning of liquid crystals.

In the reflective LCD according to the present invention, a part of the connection line where the connection line crosses the gate line is contracted narrower than the first end extended into the first pixel and the second end extended into the second pixel. This configuration reduces the feed-through voltage of each pixel, to surely prevent the flickering and burning of the liquid crystals.

It should be understood that many modifications and adaptations of the invention will become apparent to those skilled in the art and it is intended to encompass such obvious modifications and changes in the scope of the claims appended hereto.

What is claimed is:

1. A reflective liquid crystal display having a semiconductor substrate, a plurality of switching elements, a plurality of storage capacitors provided for the switching elements, respectively, the switching elements with the storage capacitors being electrically isolated from one another, a plurality of functional films laid one upon another over the switching elements and storage capacitors, a plurality of reflective pixel electrodes formed from a metal film that is a top one of the functional films, the reflective pixel electrodes being electrically isolated from one another, each of the switching elements, one of the storage capacitors connected to the switching element, and one of the reflective pixel electrodes connected to the switching element forming a pixel, the pixels being arranged in rows and columns in a matrix on the semiconductor substrate, a transparent counter electrode formed on a reverse of a transparent substrate, to face the reflective pixel electrodes, and liquid crystals sealed between the reflective pixel electrodes and the counter electrode, the reflective liquid crystal display comprising:

gate lines arranged for the rows of the pixels, respectively, and configured to be scanned in a scanning direction that is dependent on the usage of the reflective liquid crystal display, each of the gate lines being connected to gate electrodes of the switching elements that are in a corresponding one of the rows of the pixels so that the gate lines may sequentially supply gate pulses to the rows of the pixels in the scanning direction;

signal lines made from a metal film and arranged for the columns of the pixels, respectively, each of the signal lines being connected to drain electrodes (or source electrodes) of the switching elements that are in a corresponding one of the columns of the pixels so that the signal lines may sequentially supply video signals to the columns of the pixels; and a connection line formed over two pixels that are adjacent to each other in the same column of the pixels, a first end of the connection line being connected to a capacitor electrode contact of the storage capacitor formed in a first one of the two pixels and the reflective pixel electrode formed in the first pixel, a second end of the connection line crossing the gate line for the first pixel with an insulating film among the functional films being between the second end and the gate line, the second end being connected to a source electrode (or drain electrode) of the switching element formed in a second one of the two pixels.

2. The reflective liquid crystal display of claim 1, wherein:

a part of the connection line where the connection line crosses the gate line is narrowed narrower than the part thereof extended into the first pixel and the part thereof extended into the second pixel.

* * * * *